(12) United States Patent
Bacchiani

(10) Patent No.: US 12,037,001 B1
(45) Date of Patent: Jul. 16, 2024

(54) DYNAMIC ACTUATION MAP USING A NEURAL NETWORK FED BY VISUAL ODOMETRY

(71) Applicant: Ambarella International LP, Santa Clara, CA (US)

(72) Inventor: Giulio Bacchiani, Pesaro (IT)

(73) Assignee: Ambarella International LP, Santa Clara, CA (US)

( * ) Notice: Subject to any disclaimer, the term of this patent is extended or adjusted under 35 U.S.C. 154(b) by 394 days.

(21) Appl. No.: 17/381,575

(22) Filed: Jul. 21, 2021

(51) Int. Cl.
| B60W 50/06 | (2006.01) |
| B60W 10/10 | (2012.01) |
| B60W 10/18 | (2012.01) |
| B60W 10/20 | (2006.01) |
| B60W 40/10 | (2012.01) |
| G06N 3/045 | (2023.01) |
| G06N 3/08 | (2023.01) |
| G06T 7/246 | (2017.01) |

(52) U.S. Cl.
CPC ............ *B60W 50/06* (2013.01); *B60W 10/10* (2013.01); *B60W 10/18* (2013.01); *B60W 10/20* (2013.01); *B60W 40/10* (2013.01); *G06N 3/045* (2023.01); *G06N 3/08* (2013.01); *G06T 7/246* (2017.01); *B60W 2420/403* (2013.01); *B60W 2520/16* (2013.01); *G06T 2207/10016* (2013.01); *G06T 2207/20081* (2013.01); *G06T 2207/20084* (2013.01); *G06T 2207/30248* (2013.01)

(58) Field of Classification Search
CPC ...... B60W 50/06; B60W 10/10; B60W 10/18; B60W 10/20; B60W 40/10; B60W 2420/42; B60W 2520/16; G06N 3/045; G06N 3/08; G06T 7/246; G06T 2207/10016; G06T 2207/20081; G06T 2207/20084; G06T 2207/30248
See application file for complete search history.

(56) References Cited

U.S. PATENT DOCUMENTS 5,548,512 A * 8/1996 Quraishi ............. G05D 1/0255
706/905
11,630,998 B2 * 4/2023 Khan ..................... H04W 4/46
701/2

(Continued)

*Primary Examiner* — Carl C Staubach
(74) *Attorney, Agent, or Firm* — Maiorana Patent Law, PA

(57) ABSTRACT

An apparatus includes an interface and a processor. The interface may be configured to receive pixel data corresponding to an area outside of a vehicle and sensor data from said vehicle. The processor may be configured to generate one or more outputs in response to the sensor data based upon dynamic set-points for the vehicle and one or more inferences made by executing a first trained neural network model. The processor may be configured to process the pixel data arranged as video frames. The trained neural network model may have been trained by processing the pixel data arranged as video frames, performing computer vision operations to detect features in the video frames, determining the dynamic set-points for the vehicle by applying visual odometry operations on the features detected in the video frames, and modifying a plurality of weights of an untrained neural network model based on the dynamic set-points, the sensor data, and a training dataset comprising the dynamic set-points and corresponding actuator values that are representative of one or more desired inferences.

20 Claims, 10 Drawing Sheets

(56) References Cited

U.S. PATENT DOCUMENTS

| | | | |
|---|---|---|---|
| 2012/0063638 A1* | 3/2012 | Lim | G06T 7/55 |
| | | | 382/103 |
| 2015/0325003 A1* | 11/2015 | Cleveland | G06T 7/246 |
| | | | 382/103 |
| 2018/0046916 A1* | 2/2018 | Dally | G06F 7/523 |
| 2019/0176841 A1* | 6/2019 | Englard | G01S 7/40 |
| 2020/0098135 A1* | 3/2020 | Ganjineh | G06F 16/587 |
| 2020/0134372 A1* | 4/2020 | Roy Chowdhury | G05D 1/0221 |
| 2020/0175691 A1* | 6/2020 | Zhang | G06T 7/143 |
| 2021/0374412 A1* | 12/2021 | Cerri | G06T 7/90 |

* cited by examiner

DYNAMIC ACTUATION MAP USING A NEURAL NETWORK FED BY VISUAL ODOMETRY

FIELD OF THE INVENTION

The invention relates to autonomous vehicle control generally and, more particularly, to a method and/or apparatus for implementing a dynamic actuation map using a neural network fed by visual odometry.

BACKGROUND

Planner algorithms generally produce actuation commands based on desired dynamic set-points such as curvature and acceleration. Typical interfaces, which are available for controlling automated vehicles, take as input values for throttle and brake actuators and steering wheel position. Between the desired dynamic set-points and the actuation commands there is a so called "actuation map". Generally, the actuation map is a look-up table which is obtained by registering the behavior of a vehicle during a specific set of standard maneuvers. Dynamic actuation maps based on look-up tables define the behavior at specific set-points of the input; the output for target positions that are not included in the map are obtained by interpolation using the closest set-points present in the look-up table. Another approach is to describe the actuation map by tuning weights of a predetermined function (e.g., a polynomial of order n) in order to fit the data registered at the specific set-points. Sometimes, a mixture of the two approaches is used, using a look-up table for defining the throttle-brake actuation and a polynomial function for the steering wheel position. The actuation map is kept constant until dynamics of the vehicle change to a point of requiring a new tuning. Moreover, specific sensors such as high-precision GPS and inertial units are typically needed.

It would be desirable to implement a dynamic actuation map using a neural network fed by visual odometry.

SUMMARY

The invention concerns an apparatus comprising an interface and a processor. The interface may be configured to receive pixel data corresponding to an area outside of a vehicle and sensor data from said vehicle. The processor may be configured to generate one or more outputs in response to the sensor data based upon dynamic set-points for the vehicle and one or more inferences made by executing a first trained neural network model. The processor may be configured to process the pixel data arranged as video frames. The trained neural network model may have been trained by processing the pixel data arranged as video frames, performing computer vision operations to detect features in the video frames, determining the dynamic set-points for the vehicle by applying visual odometry operations on the features detected in the video frames, and modifying a plurality of weights of an untrained neural network model based on the dynamic set-points, the sensor data, and a training dataset comprising the dynamic set-points and corresponding actuator values that are representative of one or more desired inferences.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing a dynamic actuation map using a neural network fed by visual odometry that may (i) learn the actuation map during a training phase, (ii) provide a more precise, continuous map, (iii) eliminate need for interpolation between look up table entries, (iv) be constantly updated while driving, (v) be capable of automatically adapting itself whenever the dynamics of the vehicle change, (vi) allow the actuation map to be obtained with cameras, which are generally present in self-driving vehicles, (vii) eliminate need for high-precision dedicated sensors, (viii) be utilize traditional and machine learning algorithms for visual odometry, (ix) utilize a fully-connected neural network to implement the actuation map, and/or (viii) be implemented as one or more integrated circuits.

In various embodiments, a dynamic actuation map may be implemented using an artificial neural network (ANN) or artificial intelligence (AI) model. The ANN may be fed by visual odometry (VO) configured to identify measured dynamic set-points for producing actuation commands. In various embodiments, the ANN may learn the actuation map for generating the actuation commands based on the measured dynamic set-points using dynamic data computed by the visual odometry. In various embodiments, a more precise, continuous actuation map (in the sense that interpolation between look up table entries is not needed) may be produced. The actuation map may be constantly kept updated while driving. The actuation map implemented in accordance with embodiments of the invention may automatically adapt itself whenever dynamics of the vehicle changes (e.g., different tire pressure, change in the road grip, different load onboard the vehicle, etc.).

In various embodiments, a technique is provided that allows the actuation map to be obtained with cameras, which are generally present in autonomous (self-driving) vehicles, instead of relying on high-precision dedicated sensors. In various embodiments, a novel actuation map may be provided that learns the "most suitable function" (e.g., representable by a chosen neural network topology) for matching training data containing random set-points. In various embodiments, the random set-points may be obtained with visual odometry while normal driving is taking place. In an example, the number of weights to be learned may constrain the minimum number of random set-points in the training dataset. The larger the neural network, the greater the amount of training data needed to let the neural network converge to a good solution. It is also important that the training dataset is representative of different dynamic conditions (e.g., include different levels of acceleration/deceleration, steering, etc.). In an example embodiment, a dynamic actuation map may be stored as a fixed set of weights together with the topology of the neural network that is to be used.

Figure 1:
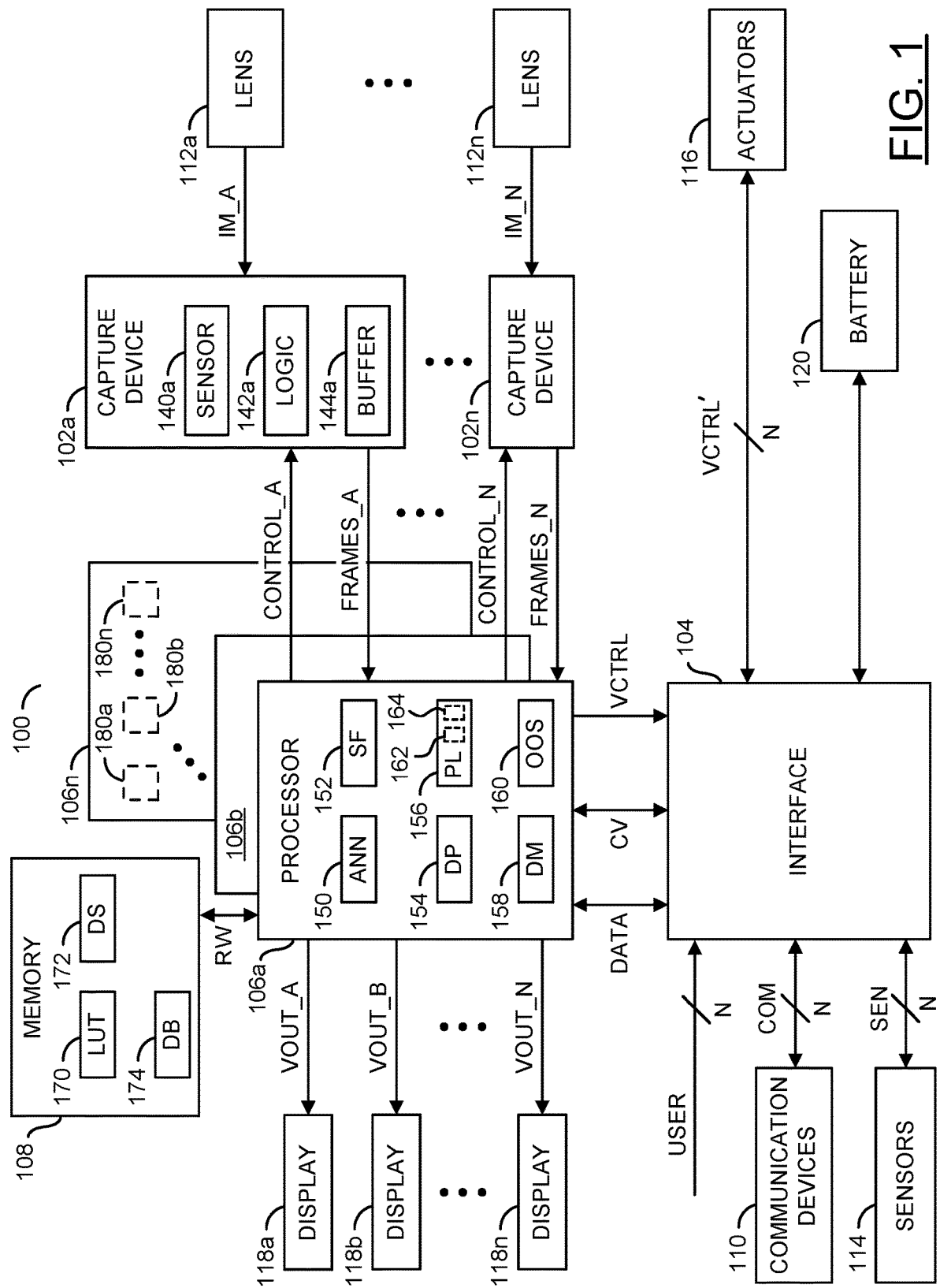
FIG. 1 is a block diagram illustrating an apparatus for implementing a dynamic actuation map using a neural network fed by visual odometry in an example embodiment.

Referring to FIG. 1, a block diagram illustrating an apparatus 100 for monitoring and responding to poor visibility conditions is shown according to an example embodiment. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuit 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be a component separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processor 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide-angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low-speed communication, the vehicle CAN bus may be implemented. In some embodiments, the interface 104 may implement a high-speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement an artificial neural network (ANN) module. In an example, the artificial neural network (ANN) module 150 may be configured to implement one or more neural network topologies including, but is not limited to, a fully-connected neural network, a convolutional neural network (CNN), and a deep learning neural network. The block 152 may implement a sensor fusion module. The block 154 may implement a driving policy module. The block 156 may implement a video processing pipeline module. The block 158 may implement a decision-making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, a light detecting device, an array of light detecting devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, adjust a throttle position, adjust a steering wheel position, control brakes, activate and/or adjust headlights, activate and/or adjust front fog lamps/lights, activate and/or adjust rear fog lamps/lights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter, and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., daytime and nighttime).

The ANN module 150 may be configured to implement fully-connected neural network capabilities. The ANN module 150 may be configured to implement a dynamic actuation map using deep learning techniques. The ANN module 150 may be configured to implement convolutional neural network capabilities. The ANN module 150 may be configured to implement computer vision using deep learning techniques. The ANN module 150 may be configured to implement pattern and/or image recognition using a training process through multiple layers of feature-detection. The ANN module 150 may be configured to conduct inferences against a machine learning model.

The ANN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the ANN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the ANN module 150 using dedicated hardware circuitry may enable calculating descriptor matching distances in real time.

The ANN module 150 may comprise a dedicated hardware module implementing CNN capabilities configured to perform feature detection of the video frames. The features detected by the ANN module 150 may be used to calculate descriptors. The ANN module 150 may determine a likelihood that pixels in the video frames belong to a particular object and/or objects in response to the descriptors. For example, using the descriptors, the ANN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing CNN capabilities in the ANN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the ANN module 150 may be configured to perform the feature detection on the video frames in order to generate the descriptors. The ANN module 150 may perform the object detection to determine regions of the video frame that have a high likelihood of matching the particular object. In one example, the types of object to match against (e.g., reference objects) may be customized using the open operand stack module 160. The ANN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision-making. The sensor fusion module 152 may also provide time-correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time-correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time-correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision-making module 158 may be configured to generate the signal VCTRL. The decision-making module 158 may be configured to use the information from the computer vision operations and/or the sensor fusion module 152 to determine which actions may be taken. For example, in an autonomous vehicle implementation, the decision-making module 158 may determine which direction to turn. The decision-making module 158 may utilize data from the ANN module 150 and/or computer vision data using a histogram-oriented gradient (HOG). The sources of data for making decisions used by the decision-making module 158 may be varied according to the design criteria of a particular implementation.

The decision-making module 158 may be further configured to determine the video data to communicate to the displays 118a-118n. The signals VOUT_A-VOUT_N may be cropped and/or adjusted in response to decisions by the decision-making module 158. For example, the decision module 158 may select one field of view (e.g., a wide-angle field of view) instead of another field of view (e.g., a narrow angle field of view) to send to the display 118a as the signal VOUT_A. In another example, the decision-making module 158 may determine which of the displays 118a-118n to use to display a notification (e.g., an advertisement) and/or where on the video data to place the notification. In yet another example, the decision-making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the ANN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360-degree video, a wide-angle video, a video having less than a 360 field of view, etc. In some embodiments, the panoramic video may provide coverage for a full 360-degree field of view. In some embodiments, less than a 360-degree view may be captured by the panoramic video (e.g., a 270-degree field of view, a 180-degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019, and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may comprise one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180a-180n may be configured to extract feature points from the video frames. The ANN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
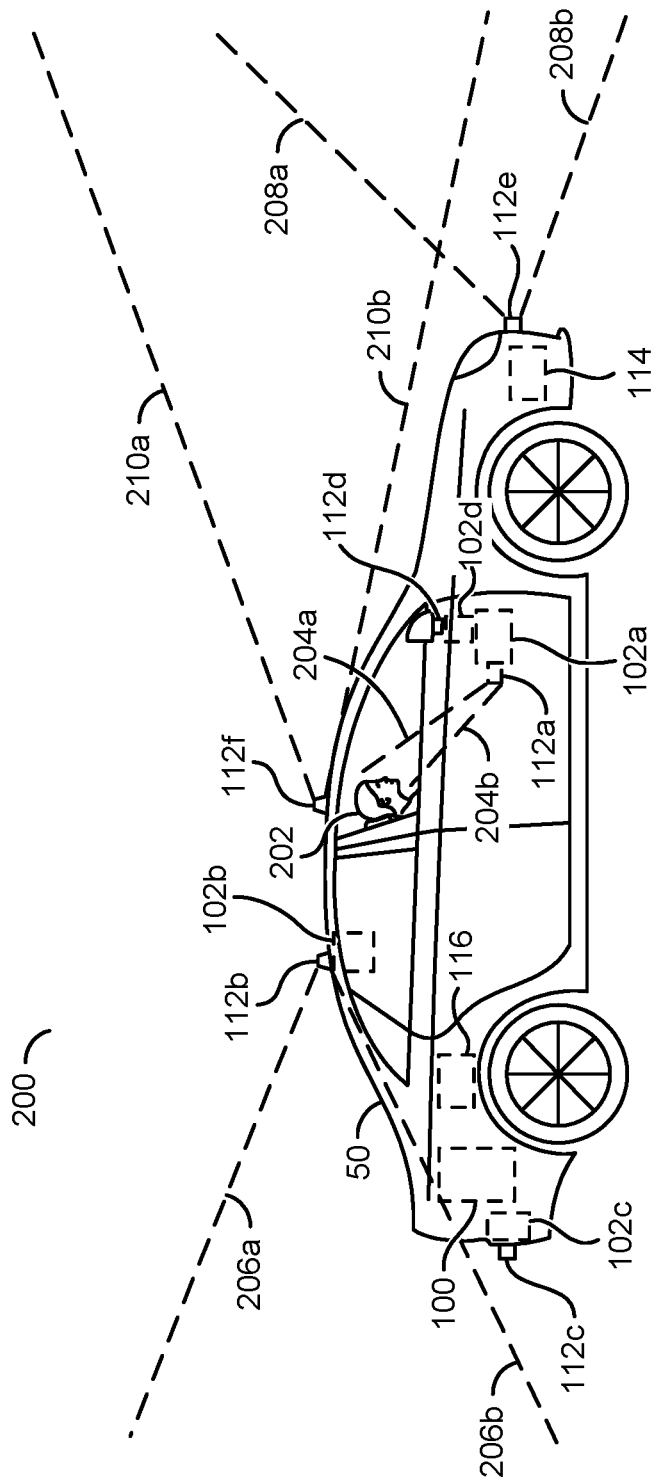
FIG. 2 is a diagram illustrating camera systems inside and outside of a vehicle in an example embodiment.

Referring to FIG. 2, a diagram illustrating camera systems 200 inside and outside of a vehicle 50 is shown according to an example embodiment. The apparatus 100 is shown as a component of the vehicle 50. In the example shown, vehicle 50 is a car. The vehicle 50 may be an ego vehicle. In some embodiments, the vehicle 50 may be a car, a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the capture device 102c, the lens 112d and the capture device 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112f) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the ANN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision-making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360-degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration, and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/ orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50 was parked, when the vehicle 50 came out of production, a reference image from when a car was in operation, turned off, left unattended, etc.). The type of reference information stored by the memory 108 may be varied according to the design criteria of a particular implementation.

The ANN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the ANN module 150 may be trained to recognize when a car seat is empty. In another example, the ANN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360-degree field of view, less than a 360-degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the ANN module 150 may implement deep learning to gather information and/or statistics about various features of objects. The ANN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the ANN module 150. The types of features extracted from video frames to perform the computer vision analysis may be varied according to the design criteria of a particular implementation.

Figure 3:
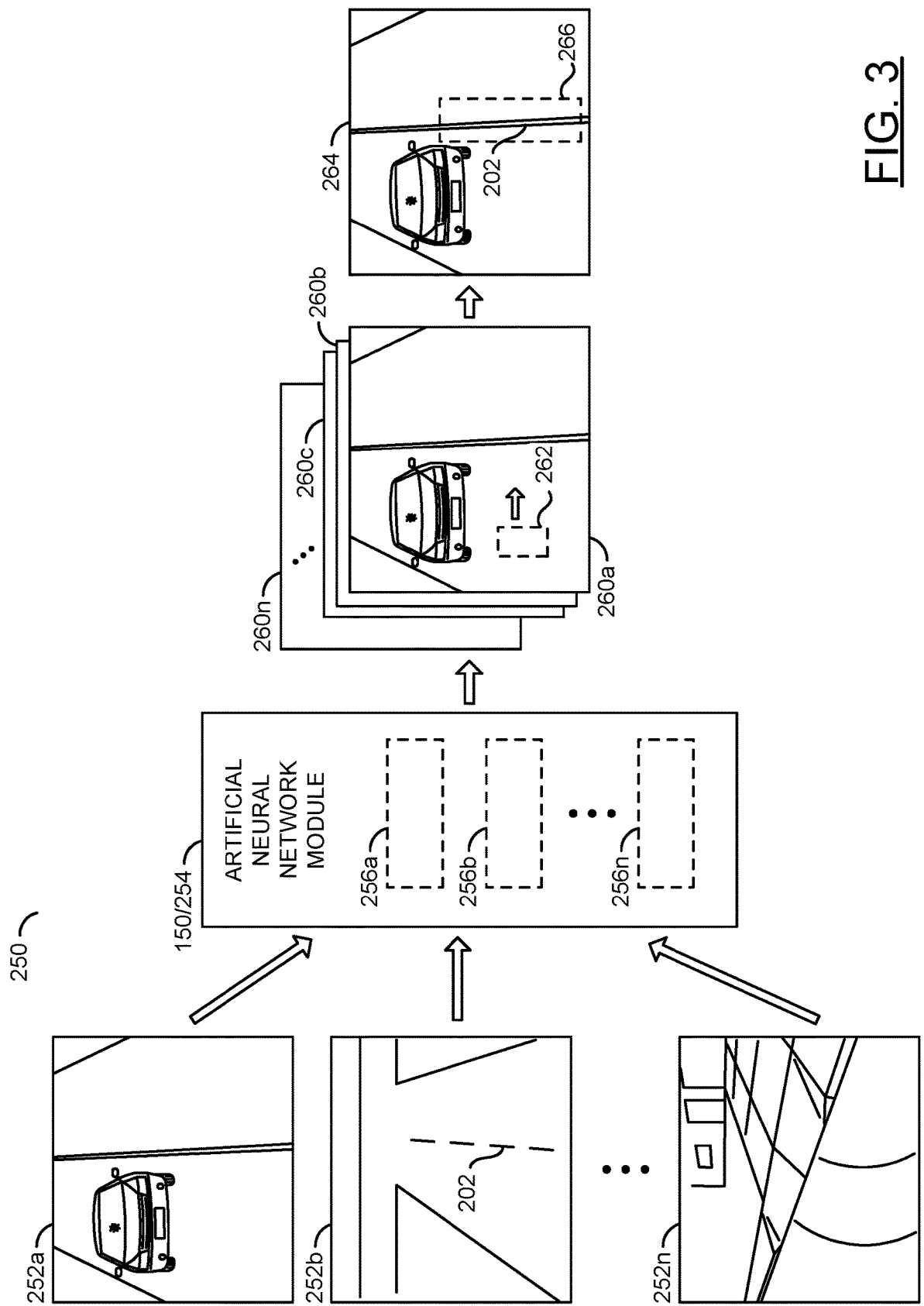
FIG. 3 is a diagram illustrating an example visualization of training an artificial neural network for object detection using fleet learning.

Referring to FIG. 3, a diagram illustrating an example visualization of training an artificial neural network for object detection using fleet learning is shown. In an example, an artificial neural network (ANN) may be implemented as a convolutional neural network (CNN), a deep learning neural network (DNN), or other neural network architecture to meet design criteria. A training and/or object detection visualization is shown. Images and/or video frames 252a-252n are shown. The images and/or video frames 252a-252n may be training data. The training data 252a-252n may comprise reference images captured from disparate sources. The disparate sources may comprise the video frames FRAMES_A-FRAMES_N processed by the video pipeline module 156 from pixel data and/or video data captured from other sources (e.g., images previously captured by the camera system 100, images received from a database of images (e.g., stock images), images captured by a fleet uploaded to a database of images, etc.). In an example, embodiments of the apparatus 100 may be implemented in a fleet of vehicles (e.g., the ego vehicle 50 and other vehicles may each implement an embodiment of the camera system 100). Each embodiment of the camera system 100 may independently generate video data that may be used as the training data 252a-252n.

To detect objects using computer vision, the ANN module 150 may implement a convolutional neural network (CNN) that may be trained using the training data 252a-252n. The training data 252a-252n may comprise a large amount of information (e.g., input video frames). For example, multiple vehicles each implementing the camera system 100 may be capable of generating more video data than the camera system 100 installed on the ego vehicle 50 alone. By combining the training data 252a-252n generated from multiple disparate sources (e.g., each implementation of the camera system 100), a greater amount of the training data 252a-252n may be generated and/or a greater variety of the training data 252a-252n may be generated (e.g., video from different types of vehicles, video from different environments, video from different states and/or countries, etc.).

The training data 252a-252n may be labeled. The labels for the training data 252a-252n may be provided as metadata of the video frames. Labeling the training data 252a-252n may enable an ANN module 250 to have a ground truth basis for determining which objects are present in the training data 252a-252n.

A block (or circuit) 254 is shown. The circuit 254 may implement a computing device, a processor and/or a server computer. The circuit 254 may implement a centralized artificial neural network. In an example implementing computer (or machine) vision, the circuit 254 may implement a centralized convolutional neural network. The centralized convolutional neural network 254 may comprise blocks (or circuits) 256a-256n. The circuits 256a-256n may implement artificial intelligence models. The centralized convolutional neural network 254 may comprise other components (e.g., a processor, a memory, various dedicated hardware modules, a communication device, etc.). The number, type and/or arrangement of the components of the circuit 254 may be varied according to the design criteria of a particular implementation.

The circuit 254 may be configured to receive the training data 252a-252n. For example, each implementation of the camera system 100 (e.g., installed on multiple different vehicles) may be configured to present the training data 252a-252n to the circuit 254. The labels implemented in the metadata of the training data 252a-252n may comprise information about the video content in the video frame. In an example, if the training data 252a comprises an image of a vehicle, the label may indicate that the video frame comprises a vehicle and/or the particular make/model/year of the vehicle. In another example, if the training data 252b comprises an image of road markings 202 on a road, the label may indicate that the video frame comprises a road marking and/or the particular characteristics of the road marking. The labels of the training data 252a-252n may provide a ground truth sample. In an example, if the artificial intelligence model 256b is configured to detect a road marking (e.g., lane marking), the training data 252a-252n may provide a ground truth sample of a road marking performing a particular marking action (e.g., lane marking). The types of information provided by the labels and/or the format of the labels may be varied according to the design criteria of a particular implementation.

The circuit 254 may be configured to train the artificial intelligence models 256a-256n. The circuit 254 may comprise similar functionality as the ANN module 150. The circuit 254 may have access to greater computing resources (e.g., power, processing capabilities, memory, etc.) than the processors 106a-106n. In an example, the circuit 254 may be implemented as part of a cloud computing service, configured to scale resources based on demand. The additional computing capabilities of the circuit 254 may be capable of handling the large amount of the training data 252a-252n received from the disparate sources.

The AI models 256a-256n may be configured to implement and/or generate a machine-readable DAG to detect various objects and/or events. A feature set may be loaded as part of the AI models 256a-256n for analyzing the video frames. The AI models 256a-256n may be continually enhanced in response to the training data 252a-252n. For example, the training data 252a-252n may be used to refine the feature set used to detect objects (e.g., to adjust neural network weight values and/or bias values for the AI models 256a-256n).

The AI models 256a-256n may be generated by the circuit 254 in response to computer vision analysis of the training data 252a-252n. One or more of the AI models 256a-256n may be communicated to the camera system 100. The AI models 256a-256n may be used by the ANN module 150. In an example, the ANN module 150 may implement an AI model, the circuit 254 may receive the training data 252a-252n to refine the AI models 256a-256n, and the ANN module 150 may be updated based on the AI models 256a-256n. Updating the ANN module 150 with one or more of the AI models 256a-256n may enable the ANN module 150 to continually improve the results of the computer vision operations.

The ANN module 150 and the circuit 254 may operate similarly. In some embodiments, the ANN module 150 may receive the training data 252a-252n and update the AI models 256a-256n (e.g., locally). In some embodiments, the circuit 254 may receive the training data 252a-252n and update the AI models 256a-256n for the ANN module 150. For example, the circuit 254 may provide a centralized source for updating the ANN module 150 implemented by multiple implementations of the camera system 100 (e.g., a fleet update). The fleet of vehicles may generate the training data 252a-252n, the circuit 254 may process the training data 252a-252n to update the AI models 256a-256n, and the fleet of vehicles may receive the AI models 256a-256n as an update to the ANN module 150 in order to benefit from the training data 252a-252n generated by the fleet of vehicles. The computer vision operations and/or training performed by the ANN module 150 and the computer vision operations and/or the training performed by the circuit 254 may be implemented similarly. For example, descriptions of operations performed by the circuit 254 may be assumed to apply to the ANN module 150 interchangeably. Similarly, the computer vision operations performed on the training data 252a-252n may be similar to the computer vision operations performed on the video frames FRAMES_A-FRAMES_N generated by the processors 106a-106n.

The artificial intelligence models 256a-256n may be configured to be trained to detect particular objects. Each of the artificial intelligence models 256a-256n may be trained to recognize, classify and/or distinguish one or more types of objects. The number of artificial intelligence models 256a-256n implemented by the ANN module 150 and/or the circuit 254 may be varied according to the design criteria of a particular implementation.

The ANN module 150 may operate in a training mode of operation. In an example, the AI models 256a-256n may be directed acyclic graphs (DAGs). In the training mode of operation, the AI models 256a-256n may analyze many examples of objects. In one example, if the AI model 256a is configured to detect vehicles, the AI model 256a analyze many examples of vehicle images. Training the AI models 256a-256n may determine and/or calculate parameters, weighting values and/or biases for the directed acyclic graphs. The trained AI models 256a-256n may be a DAG with parameters, weighting values and/or biases pre-programmed and/or pre-defined (e.g., based on self-directed learning) for detecting particular types of objects. In some embodiments, the trained AI models 256a-256n may be a quantized neural network (e.g., a reduced size neural network configured to operate on an edge device that has been modified based on a full-size neural network that was trained offline (e.g., on the circuit 254).

While the apparatus 100 is in operation, the ANN module 150 may continually learn using new video frames as the input training data 252a-252n. However, the processors 106a-106n may be pre-trained (e.g., configured to perform computer vision before being installed in the vehicle 50). For example, the results of training data 252a-252n (e.g., the machine learning models 256a-256n) may be pre-programmed and/or loaded into the processors 106a-106n. The processors 106a-106n may conduct inferences against the machine learning models 256a-256n (e.g., to perform object detection). In some embodiments, the signal CV generated by the processors 106a-106n may be sent to the interface 104 to enable the communication devices 110 to upload computer vision information (e.g., to the centralized server 254 and/or peer-to-peer communication). Similarly, the communication devices 110 may receive computer vision data and the interface 104 may generate the signal CV in order to update the ANN module 150.

In some embodiments, fleet learning may be implemented to gather large amounts of the training data 252a-252n. For example, cameras may be installed in production facilities (e.g., at the end of the production line) to capture many reference images of different types of vehicles to be used as the training data 252a-252n. In the example, the training data 252a-252n may capture video data of various vehicle occupants (e.g., captured from one of the capture devices 104a-104n that provides in-cabin monitoring of the ego vehicle 50). For example, the training data 252a-252n may be a sequence of video frames captured prior to the processors 106a-106n determining that a change in orientation of various body parts of an occupant has been detected (e.g., caused by an occupant reaching out, an occupant leaning forward, an occupant moving hands and/or arms, etc.). The training data 252a-252n may be labeled based on whether the prediction was incorrect or correct. Using the training data 252a-252n (e.g., video frames captured from many different vehicles as the vehicles are produced, as different vehicles are deployed on the roads, etc.), many training data sets may be available to train the AI models 256a-256n. In an example, different makes and models of vehicles may be analyzed. In another example, different interior colors may be analyzed. In yet another example, different drivers (e.g., different people) may be analyzed. In still another example, different driving scenes (e.g., flat surfaces, clear weather, dark scenes, etc.) may be analyzed. In some embodiments, the training data 252a-252n may be uploaded to the central CNN module 254 to perform and/or train the AI models 256a-256n for the computer vision. The results (e.g., the AI models 256a-256n) of the training from the central CNN module 254 may be installed on each of the ANN modules 150 of each apparatus 100 (or transmitted while the apparatus 100 is in operation to remotely provide updates via the communication devices 110).

The ANN module 150 and/or the circuit 254 may receive the training data 252a-252n in a training mode of operation. The ANN module 150 may analyze captured video frames (e.g., the signal FRAMES_A-FRAMES_N) to detect object, classify objects and/or extract data about objects using the trained AI models 256a-256n. To perform the training and/or the computer vision operations, the ANN module 150 may generate a number of layers 260a-260n. On each one of the layers 260a-260n, the ANN module 150 may apply a feature detection window 262. In an example, the feature detection window 262 is shown on a portion of the layer 260a. A convolution operation may be applied by the ANN module 150 on each of the layers 260a-260n using the feature detection window 262.

The convolution operation may comprise sliding the feature detection window 262 along the layers 260a-260n while performing calculations (e.g., matrix operations). The feature detection window 262 may apply a filter to pixels that are within the current location of the feature detection window 262 and/or extract features associated with each layer 260a-260n. The groups of pixels within the feature detection window 262 may be changed as the feature detection window 262 slides along the pixels of the layers 260a-260n. The feature detection window 262 may slide along the layers 260a-260n pixel by pixel to capture and/or analyze different groupings of pixels. For example, a first location of the feature detection window 262 may comprise a box of pixels A0 through D0 and A3 through D3 and then the feature detection window 262 may slide horizontally one pixel to comprise a box of pixels B0 through E0 and B3 through E3 (e.g., the pixels from B0 through D0 and B3 through D3 are used in both the first and second operation). The size of the feature detection window 262 and how far (e.g., a stride length) the feature detection window 262 moves for each operation may be varied according to the design criteria of a particular implementation.

The feature detection window 262 may be applied to a pixel and a number of surrounding pixels. In an example, the layers 260a-260n may be represented as a matrix of values representing pixels and/or features of one of the layers 260a-260n and the filter applied by the feature detection window 262 may be represented as a matrix. The convolution operation may apply a matrix multiplication between the region of the current layer covered by the feature detection window 262. The convolution operation may slide the feature detection window 262 along regions of the layers 260a-260n to generate a result representing each region. The size of the region, the type of operations applied by the filters and/or the number of layers 260a-260n may be varied according to the design criteria of a particular implementation.

Using the convolution operations, the ANN module 150 may compute multiple features for pixels of an input image in each extraction step. For example, each of the layers 260a-260n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 262 operates on a pixel and nearby pixels, the results of the operation may have location invariance. The layers 260a-260n may comprise convolution layers, pooling layers, non-linear layers and/or fully connected layers. In an example, the convolution operations may learn to detect edges from raw pixels (e.g., the first layer 260a), then use the feature from the previous layer (e.g., the detected edges) to detect shapes in a next layer (e.g., 260b) and then use the shapes to detect higher-level features (e.g., facial features, vehicles, pedestrians, etc.) in higher layers and the last layer may be a classifier that uses the higher level features.

Using the input video frames as the training data 252a-252n, the ANN module 150 and/or the AI models 256a-256n may be trained. The training may comprise determining weight values for each of the layers 260a-260n. For example, weight values may be determined for each of the layers 260a-260n for feature extraction (e.g., a convolutional layer) and/or for classification (e.g., a fully connected layer). The weight values learned by the ANN module 150 and/or the AI models 256a-256n may be varied according to the design criteria of a particular implementation.

The ANN module 150 may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the ANN module 150 to extract features from the training data 252a-252n may be varied according to the design criteria of a particular implementation.

The ANN module 150 may receive and analyze input images (e.g., the training data 252a-252n in the training mode of operation and/or input video frames when deployed in the ego vehicle 50) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the ANN module 150 may enable information sharing between components of the processors 106a-106n. The color detection process may be used to extract features from the training data 252a-252n and/or input video frames.

The color detection and/or feature extraction process is generally operational to determine a color likelihood value that pixels in each pixel location of an input image (e.g., the training data 252a-252n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The ANN module 150 may implement a color classification operation. The color classification operation may determine a color likelihood value for one or more pixel locations in the input images. The color likelihood values generally define a probability that a particular pixel location is approximately similar to or matches the specified color (e.g., red, green, yellow, or white). The results of the color classification operation may be arrays (or probability maps) of color likelihood values that indicate a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 262 may be considered by the color detection process on one of the layers 260a-260n. The feature extraction window 262 may consider a pixel of interest. In an example, the pixel of interest may be a current pixel location being color classified. The feature extraction window 262 may generally represent a local context and contrast around the pixel of interest.

The pixels of the training data 252a-252n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the ANN module 150 may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The ANN module 150 generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the ANN module 150 may generate one or more reference video frames 264. The reference video frame 264 may comprise masks and/or categorized instances of the reference objects 266. The reference objects 266 may be objects that have been sufficiently defined to enable reliable recognition using computer vision.

The processors 106a-106n may generate images that provide better image processing that allows "seeing" objects in challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases and/or exterior use cases. The computer vision operations performed by the ANN module 150 may determine a size, shape, orientation and/or arrangement of a recognized object.

By analyzing a number of video frames in sequence, the computer vision operations performed by the ANN module 150 may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the ANN module 150.

In some embodiments, the machine learning may be performed by the centralized CNN module 254 that has access to greater computing resources than the camera system 100. Generally, the processing capabilities and/or computing resources available to the centralized CNN module 254 (e.g., implemented as part of a cloud computing network) may be greater than the processing capabilities and/or computing resources available to the ANN module 150 implemented by the processors 106a-106n. For example, the centralized CNN module 254 may perform the machine learning using the training data 252a-252n, develop the machine learning models 256a-256n, and then provide the machine learning model 254 to each apparatus 100 in a fleet of vehicles.

Even after the AI models 256a-256n have been trained and/or the ANN module 150 has been deployed, the processors 106a-106n and/or the centralized CNN module 254 may continue to receive the training data 252a-252n from each apparatus 100, refine the machine learning models 256a-256n, and then provide updates to the machine learning model for each apparatus 100 (received using the communication device 110). The centralized CNN module 254 may develop, refine and/or enhance the machine learning models 256a-256n by receiving input (e.g., the training data 252a-252n) from multiple sources (e.g., each vehicle that implements the apparatus 100).

In some embodiments, the machine learning may be performed by the ANN module 150 implemented by the processors 106a-106n. For example, the processors 106a-106n and/or the apparatus 100 may be an edge device, and the ANN module 150 may implement the machine learning models 256a-256n adapted to the constraints of the edge device. The processors 106a-106n may be configured to compress the machine learning models 256a-256n (e.g., compressed compared to the machine learning models 256a-256n implemented by the centralized CNN module 254). In an example, compressing the machine learning models 256a-256n may comprise quantization, pruning, sparsification, etc. Compressing the machine learning model may enable the ANN module 150 to perform the machine learning and/or conduct inferences against the machine learning models 256a-256n (e.g., object detection). By performing the machine learning at the edge (e.g., locally on the processors 106a-106n), there may be reduced latency compared to performing wireless communication with the centralized CNN module 254. Similarly, the apparatus 100 may be able to perform the machine learning without maintaining a wireless connection. By performing the machine learning at the edge, privacy may be maintained since the training data 252a-252n would be kept local. Performing the machine learning at the edge (e.g., locally), the processors 106a-106n may preserve privacy and avoid heavy video processing running on back-end servers. Whether the machine learning is performed locally (e.g., at the edge), performed using a centralized resource and/or performed using a combination of local and centralized resources may be varied according to the design criteria of a particular implementation.

The machine learning performed by the ANN module 150 and/or the circuit 254 may comprise supervised training. For example, the ANN module 150 may be self-trained using the training data 252a-252n. Supervised learning may enable the ANN module 150 to automatically adjust the weighting values and/or biases in response to metadata contained within the training data 252a-252n (e.g., a designer and/or engineer may not need to program the weighting values for the AI models 256a-256n). The metadata contained within the training data 252a-252n may provide ground truth data. Backpropagation may be implemented to compute a gradient with respect to the weighting values in response to the training data 252a-252n. For example, the training data 252a-252n may comprise the metadata labels that may enable the ANN module 150 to extract characteristics and apply the extracted characteristics to the weighting values based on the metadata labels.

In one example, where the training data 252a-252n is labeled as providing an image of a vehicle, the ANN module 150 may extract the features from the image and apply the extracted features to the weighting values to make future computer vision operations more likely to determine the presence of a vehicle. Similarly, where the training data 252a-252n is labeled as not providing an image of a vehicle, the ANN module 150 may extract the features from the image and apply the extracted features to the weighting values to make future computer vision operations more likely to determine the presence of a vehicle (e.g., particular weighting values may be decreased to de-emphasize particular features that may not be associated with a vehicle). The ANN module 150 may implement a deep convolutional neural net to enable features to be learned through training.

The labels for the training data 252a-252n may be acquired through various sources. In one example, the training data 252a-252n may be labeled manually (e.g., a person may provide input to indicate which objects are present in a video frame). In another example, the training data 252a-252n may be labeled using sensor fusion. For example, sensor readings may provide the label (e.g., a temperature sensor may indicate a cold environment, an accelerometer and/or a gyroscope may indicate an orientation of the ego vehicle 50, an accelerometer and/or gyroscope may indicate whether an impact has been detected, a proximity sensor may provide a distance value between the ego vehicle 50 and another object, etc.). The sensor fusion module 152 may enable the metadata labels to provide a ground truth value. The source of the labels for the training data 252a-252n may be varied according to the design criteria of a particular implementation.

Figure 4:
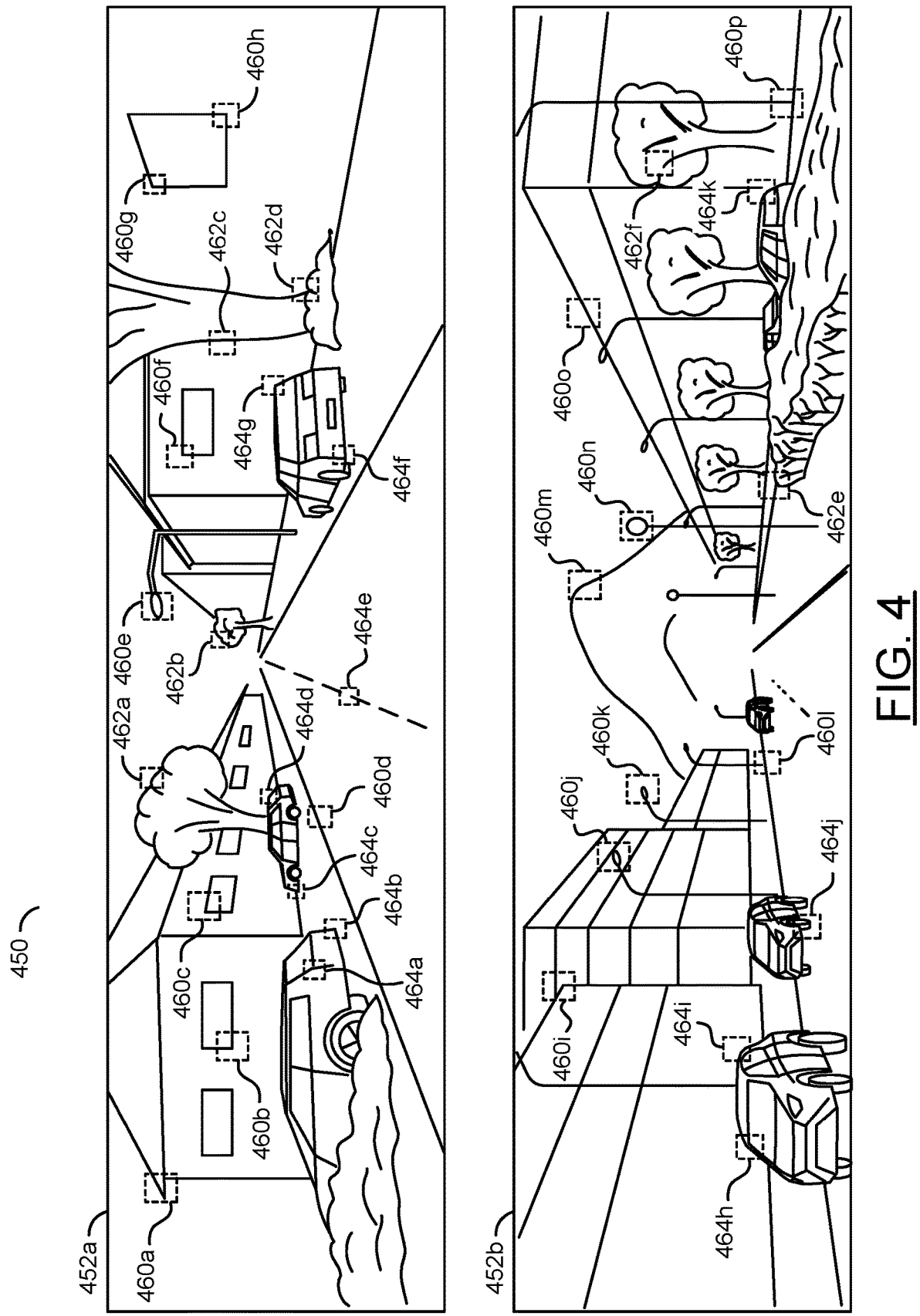
FIG. 4 is a diagram illustrating feature detection on example video frames.

Referring to FIG. 4, a diagram illustrating feature detection on example video frames is shown. A dual view 450 is shown. The dual view 450 may comprise video frames 452a-452b. The video frames 452a-452b may be representative examples of video frames captured by the capture devices 102a-102n. For example, the video frames 452a-452b may be two of the video frames FRAMES_A-FRAMES_N corresponding to an area outside of the ego vehicle 50. In the example shown, the video frame 452a may be a forward view from the perspective of the ego vehicle 50 and the video frame 452b may be a reverse view from the perspective of the ego vehicle 50. In an example, the video frames 452a-452b may be captured at the same time (e.g., the video frame 452a may represent a forward view and the video frame 452b may be a reverse view for a particular location of the ego vehicle 50). The processors 106a-106n may be configured to generate the video frames 452a-452b for use by one or more of the displays 118a-118n. The processors 106a-106n may be configured to generate the video frames 452a-452b in order to perform the feature detection to determine the precise localization of the ego vehicle 50.

Dotted boxes 460a-460p are shown on the video frames 452a-452b. Dotted boxes 462a-462f are shown on the video frames 452a-452b. Dotted boxes 464a-464k are shown on the video frames 452a-452b. The dotted boxes 460a-460p, the dotted boxes 462a-462f and/or the dotted boxes 464a-464k may be objects and/or image features detected by the processors 106a-106n. For example, the capture devices 102a-102n may capture the environment around the ego vehicle 50 and provide the video frames FRAMES_A-FRAMES_N to the processors 106a-106n and then the ANN module 150 and/or the computer vision pipeline portion 162 may analyze the video frames and identify the image features 460a-460p, 462a-462f and/or 464a-464k. The image features 460a-460p, 462a-462f and/or 464a-464k shown on the video frames 452a-452b may be representative examples. The number, type and/or location of each of the image features 460a-460p, 462a-462f and/or 464a-464k may be varied according to the design criteria of a particular implementation.

The image features 460a-460p, 462a-462f and/or 464a-464k may represent objects and/or identifiable patterns in the video frames 452a-452b detected by performing the computer vision operations. The computer vision operations performed by the processors 106a-106n may be configured to extract the image features 460a-460p, 462a-462f and/or 464a-464k from the video frames 452a-452b. For example, the processors 106a-106n may detect the image features 460a-460p, 462a-462f and/or 464a-464k by analyzing the incoming video frames in real time. The image features 460a-460p, 462a-462f and/or 464a-464k may be used by the processors 106a-106n for various features performed by the apparatus 100 (e.g., collision avoidance, lane departure assistance, autonomous driving, generating video data for electronic mirrors, providing warnings to the driver 202, etc.). For example, the image features 460a-460p, 462a-462f and/or 464a-464k may be used for various functionality of the apparatus 100 in addition to the precise localization.

The image features 460a-460p, 462a-462f and/or 464a-464k may be data extracted from the video frames 452a-452b by the computer vision operations. The image features 460a-460p, 462a-462f and/or 464a-464k may be automatically selected by the processors 106a-106n. For example, the image features 460a-460p, 462a-462f and/or 464a-464k may be encode points of the video frames 452a-452b that have a particularly high quantity of information (e.g., corners or points of high luminance contrast). The image features 460a-460p, 462a-462f and/or 464a-464k may encode position and image content.

The image features 460a-460p may be invariant features (e.g., static features). The invariant features 460a-460p may be image features that may not or are unlikely to change with respect to the location. In the example shown, the invariant feature 460a may be a portion of a building. In another example, the invariant feature 460c may be a window on a building. In yet another example, the invariant feature 460e may be a street light. In still another example, the invariant feature 460m may be a mountain in the landscape. The invariant features 460a-460p may remain the same size when viewed from a particular location. The invariant features 460a-460p may be reliable features in the captured video frames used by the processors 106a-106n to determine the precise localization.

The image features 462a-462f may be movable features. The movable features 462a-462f may be moderately reliable image features but may change over time. In the example shown, the movable feature 462a is a tree (the tree may be unlikely to move but may grow with time). In another example, the movable feature 462e may be a bush (the bush may grow or be trimmed over time). The movable features 462a-462f may provide some assistance for localization. However, the movable features 462a-462f may be unreliable long term due to a high likelihood of changing size/shape and may not be the same size when viewed from a particular distance.

The image features 464a-464k may be unreliable image features. The unreliable image features 464a-464k may be likely to change each time the ego vehicle 50 is at a particular location. In the example shown, the unreliable feature 464a may be a parked vehicle. Even though the parked vehicle may commonly be parked in a particular driveway, the parked vehicle may be commonly moved (e.g., not home, parked in a different spot, replaced by another car, etc.). In another example, the unreliable feature 464e may be a road marking. Road markings may be changed (e.g., a turning lane is added, a bike lane is added, etc.). Other examples of unreliable features may be pedestrians, cyclists and/or shadows. The unreliable features 464a-464k may be image features that may not be the same size when viewed from a particular location and/or may not be present each time the ego vehicle 50 is at a particular location. The unreliable features 464a-464k may not be used by the processors 106a-106n to perform the localization.

In some embodiments, the decision module 158 may be configured to distinguish between the invariant features 460a-460p, the movable features 462a-462f and the unreliable markers 464a-464k. The ANN module 150 may then determine the type of objects detected and based on the type and/or classification of object recognized (e.g., building, tree, pedestrian, etc.), the decision module 158 may determine whether or not to use the image features to determine the localization.

In some embodiments, the computer vision operations performed by the portion 162 may be configured to implement a feature matcher. The feature matcher may be configured to match the image features that correspond to the invariant features 460a-460p. The feature matcher may be configured to reject the image features that do not match (e.g., the movable features 462a-462f and/or the unreliable markers 464a-464k). In one example, the processors 106a-106n may reject the image features that do not match according to "Robust Feature Matching for Loop Closing and Localization", Jungho Kim and In-So Kweon (Proceedings of the 2007 IEEE/RSJ International Conference on Intelligent Robots and Systems, Oct. 29-Nov. 2, 2007), appropriate portions of which are hereby incorporated by reference.

The processors 106a-106n may use the invariant features 460a-460p to perform the precise localization. In one example, the processors 106a-106n may use the movable features 462a-462f to determine the localization depending on the context (e.g., how much time has passed, the likelihood that the object has changed shape, etc.). In another example, the processors 106a-106n may reject the movable features 462a-462f (e.g., the movable features 462a-462f may not be used to determine the precise localization). The processors 106a-106n may not use the unreliable features 464a-464k for the localization.

The invariant image features 460a-460p may be used by the processors 106a-106n to determine the precise localization of the ego vehicle 50 when located in a public location (e.g., where the driver 202 does not have control over the environment). In one example, the processors 106a-106n may perform the localization using the image features 460a-460p compared to previously stored image features as described in "Learning Deep Features for Scene Recognition using Places Database", Bolei Zhou, et al. (Advances in Neural Information Processing Systems 27 (NIPS), 2014), appropriate portions of which are hereby incorporated by reference. The specific collection of invariant image features 460a-460p (e.g., image features that are invariant with respect to the scene) may be stored by the database 174. The processors 106a-106n may be configured to identify whether detected image features in a currently captured video frame matches the invariant image features 460a-460p stored in the database 174 (e.g., to identify the location based on a set of previously seen locations). Image features in the current video frame that are outliers (e.g., image features that correspond to the unreliable image features 464a-464k such as movable objects and features generated by artifacts like reflections and/or different lighting) may be automatically identified by the processors 106a-106n and removed by the feature matching performed by the decision module 158.

The precision of the localization performed by the processors 106a-106n using the invariant image features 460a-460p may be as close as a few centimeters. The processors 106a-106n may be configured to extract the invariant image features 460a-460p from a current video frame and then compare the invariant image features 460a-460p of the current video frame to the stored image features from the database 174 (e.g., a subset of all the database entries filtered by the coarse GPS coordinates and/or odometry of the ego vehicle 50). For example, when the current invariant image features 460a-460p match the stored image features then the processors 106a-106n may decide that the current location of the ego vehicle 50 may be within a few centimeters of the stored location.

In some embodiments, the decision module 158 may select inliers (e.g., the invariant image features 460a-460p that match one of the entries of the database 174) and outliers (e.g., the unreliable features 464a-464k of the current video frame such as objects that were not present in the scene at the time when the database was generated). Using the inliers for the invariant image features 460a-460p, the processors 106a-106n may perform a best fitting of the image data for the current video frame with the data (e.g., stored image features) in the entry of the database 174 in order to identify the camera pose (e.g., extrinsic camera parameters such as 3 degrees of freedom for position and 3 degrees of freedom for orientation). The intrinsic parameters of the capture devices 102a-102n may be assumed to be calibrated.

Figure 5:
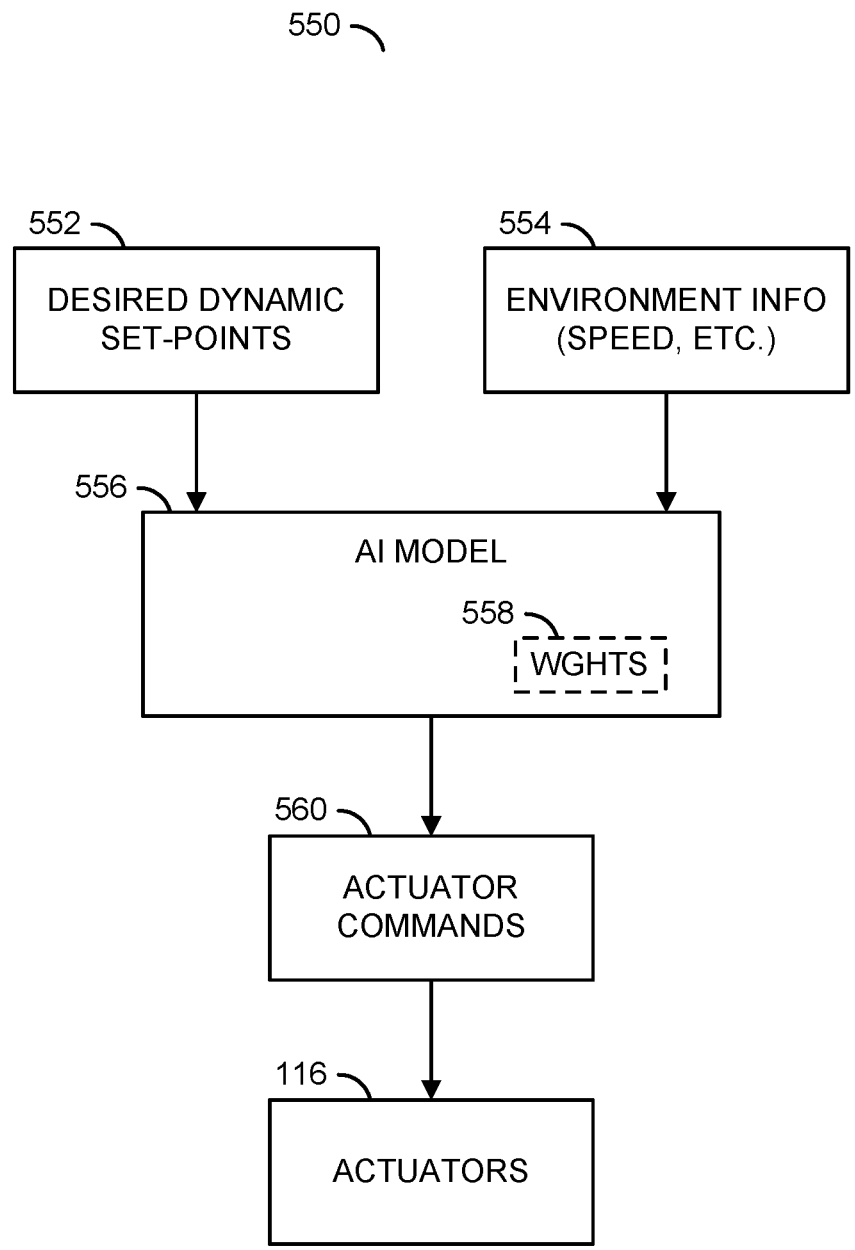
FIG. 5 is a diagram illustrating a neural network implementing a dynamic actuation map in an example embodiment.

Referring to FIG. 5, a diagram illustrating a neural network implementing a dynamic actuation map in an example embodiment is shown. In various embodiments, an artificial neural network (ANN) module 550 may implement an artificial intelligence (AI) model of an actuation map using a fully-connected neural network architecture. Fully-connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameter (weights and biases) determined during the training process.

In various embodiments, an artificial intelligence (AI) model that generates the dynamic actuation map is generally implemented using a fully-connected neural network, because the inputs to the dynamic actuation map are not images, but numerical values (e.g., dynamic set-points such as acceleration, curvature, etc. and additional environmental variables such as speed, pitch, etc. of the vehicle). A deployed (or inference) mode of operation of an already-trained actuation map is shown. For usage of the already-trained actuation map, images are not needed, apart from generating an estimation of a current motion (e.g., speed, slope, etc.) of the vehicle, which may be also obtained from sensors present in every modern vehicle. In the inference mode, desired dynamic set-points 552 and environmental variables 554 are presented as inputs to an AI model 556. In an example, the desired dynamic set-points 552 may be selected by a path planning application. The AI model 556 includes a set of weights and bias parameters (WGHTS) 558 defining the already-trained actuation map. In applications that need external (e.g., non-human) control of the driving commands of the vehicle (e.g., autonomous vehicle applications), the desired dynamic set-points 552 generally comprise acceleration and curvature values received from the path planning application (or module).

The acceleration and curvature values generally define a trajectory that is to be followed by the vehicle 50. The AI model 556 generates actuator commands 560 based on the desired dynamic set-points 552 and the environmental variables 554. In an example, the environmental variables 554 generally comprise speed. In another example, to provide a more precise actuation map, the environmental variables 554 may also comprise slope of the road (e.g., the throttle has to be pushed more when going uphill). In an example, the slope of the road may be determined indirectly by feeding the AI model 556 with the current pitch angle of the vehicle (e.g., obtained using an accelerometer, which is also typically already present in modern vehicles). However, the slope may be also estimated using a dedicated algorithm (e.g., a CNN) analyzing video frames.

In an example, the ANN module 550 may be implemented by the ANN module 150. To generate actuator commands based on desired dynamic set-points, the ANN module 150 may implement a fully-connected neural network that may be trained by processing pixel data arranged as video frames, performing computer vision operations to detect features in the video frames, determining measured dynamic set-points for the vehicle by applying visual odometry operations on the features detected in the video frames, and modifying a plurality of weights of an untrained neural network based on the measured dynamic set-points, sensor data, and a training dataset comprising dynamic set-points and corresponding actuator values that are representative of one or more desired inferences. In an example, the actuator values may be read from control modules and/or dedicated sensors of a vehicle being driven by a human being along the path imaged in the video frames. The training dataset may enable the ANN module 550 to have a ground truth basis for determining which actuator commands should be generated for particular dynamic set-points and environmental inputs.

A block (or circuit) 556 is shown. The circuit 556 may implement a computing device, a processor and/or a server computer. The circuit 556 may implement a centralized artificial neural network. In an example implementing a dynamic actuation map, the circuit 556 may implement a centralized fully-connected neural network. The centralized fully-connected neural network 556 may comprise a set of weights and bias parameters 558. The circuit 556 may implement an artificial intelligence model. The centralized fully-connected neural network 556 may comprise other components (e.g., a processor, a memory, various dedicated hardware modules, a communication device, etc.). The number, type and/or arrangement of the components of the circuit 556 may be varied according to the design criteria of a particular implementation.

The circuit 556 may be configured to receive the desired dynamic set-points 552 and the environmental information (variables) 554. The circuit 556 may be configured to generate the actuator commands 560. The circuit 556 may be configured to generate the actuator commands 560 based upon the desired dynamic set-points 552, the environmental information 554, and the set of weights and bias parameters 558. The set of weights and bias parameters 558 and the chosen neural network topology generally implement the most suitable function for matching the actuator commands 558 to the desired dynamic set-points 552 and the environmental information 554 received at the inputs of the circuit 556. The actuator commands 560 may be presented to the actuators 116 to control operation of the vehicle 50.

The circuit 556 may comprise similar functionality as the ANN module 150. The circuit 556 may have access to greater computing resources (e.g., power, processing capabilities, memory, etc.) than the processors 106a-106n. In an example, the circuit 556 may be implemented as part of a cloud computing service, configured to scale resources based on demand. The additional computing capabilities of the circuit 556 may be capable of handling the autonomous driving tasks of the vehicle 50.

The AI model 556 may be configured to implement and/or generate a machine-readable directed acyclic graph (DAG) to generate the actuator commands 560. The DAG and the set of weights and bias parameters 558 may be loaded as part of the AI model for generating the actuator commands 560. Descriptions of operations performed by the circuit 556 may be assumed to apply to the ANN module 150 interchangeably. In one example, training the AI model 556 may determine and/or calculate parameters, weighting values and/or biases for the directed acyclic graph. The trained (or already-trained) AI model 556 may be a DAG with parameters, weighting values and/or biases pre-programmed and/or pre-defined (e.g., based on self-directed learning). In some embodiments, the trained AI model 556 may be a quantized neural network (e.g., a reduced size neural network configured to operate on an edge device that has been modified based on a full-size neural network that was trained offline (e.g., on the circuit 556). In some embodiments, the trained AI model 556 may be implemented as a compact neural network (e.g., approximately 20K weights) and may not need particular hardware to provide fast inference. However, specific hardware (e.g., GPU, etc.) may be used to accelerate a training phase.

Figure 6:
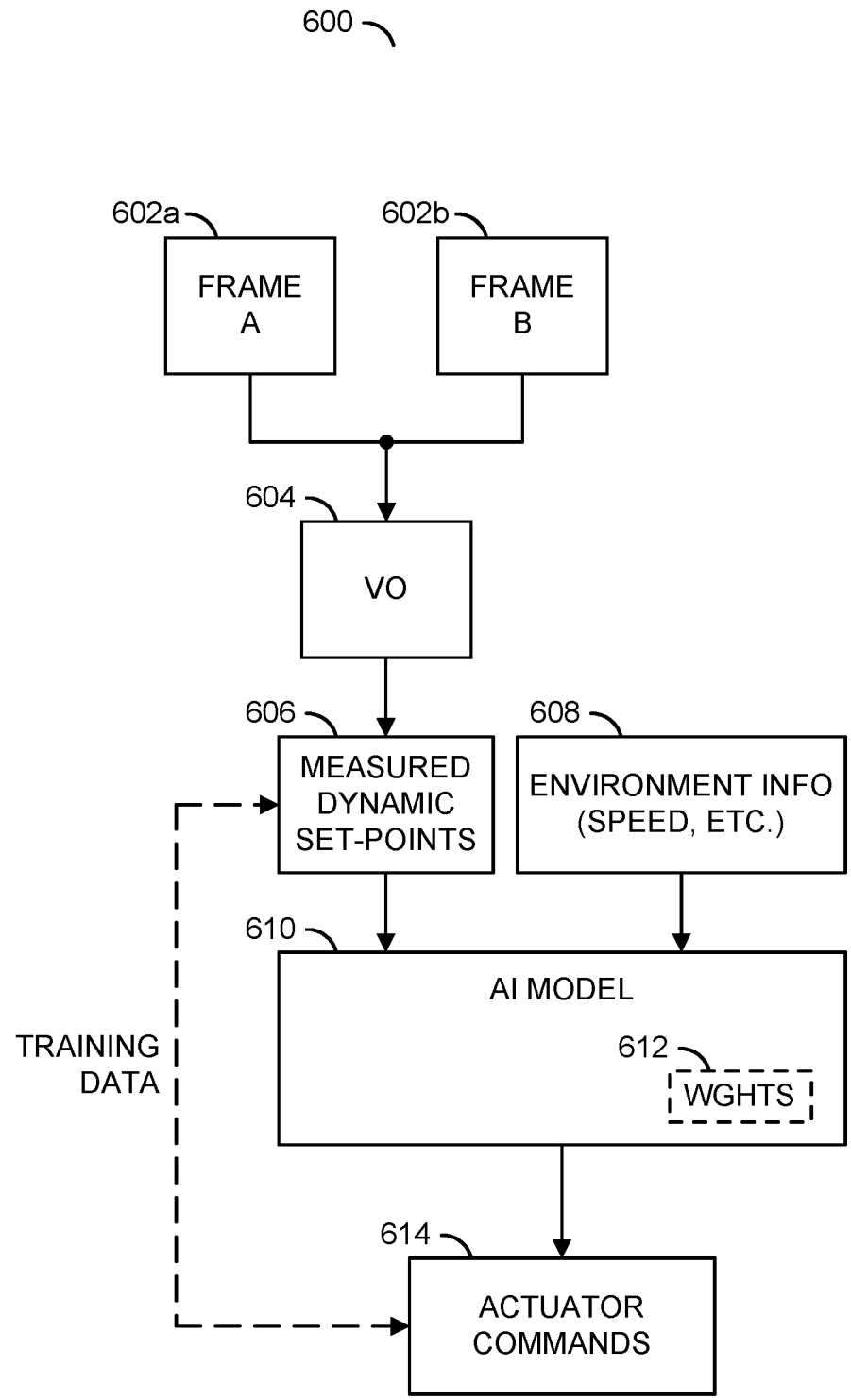
FIG. 6 is a diagram illustrating a technique for training the neural network of FIG. 5 in an example embodiment.

Referring to FIG. 6, a diagram is shown illustrating a training process for generating the neural network of FIG. 5 in an example embodiment. In an example, a training process 600 may be applied to a fully-connected neural network architecture to generate a dynamic actuation map in an example embodiment. An artificial intelligence (AI) model that generates the dynamic actuation map is generally implemented using a fully-connected neural network, because the inputs to the dynamic actuation map are not images, but numerical values (e.g., desired dynamic set-points and additional environmental variables such as speed, pitch, etc. of the vehicle). A training mode of operation of a neural network implementing a dynamic actuation map in an example embodiment is shown. In an example, the training process 600 for generating a trained actuation map may use images (e.g., captured by a number of vehicle cameras) of a path (or route) being driven by a vehicle to generate dynamic set-points. Images may also be used to generate an estimation of a current speed and/or pitch angle of the vehicle. The current speed and/or pitch angle of the vehicle may be also obtained from sensors (e.g., accelerometer, wheel rotation sensors, etc.) present in every modern vehicle.

In an example, a training process 600 may begin by processing pixel data (e.g., from the number of cameras around the vehicle) arranged as a number of video frames 602a-602n. Pairs of video frames (e.g., 602a and 602b, etc.) may be processed (e.g., by performing computer vision operations) to detect features in the video frames and determining the dynamic set-points for the vehicle. In an example, visual odometry (VO) operations 604 may be performed on the features detected in the video frames to generate measured dynamic set-points 606. In an example, the visual odometry (VO) operations may be performed (e.g., by the computer vision pipeline portion 162) using a traditional algorithm. The traditional algorithm may perform computations comparing the features of two consequent frames of each camera. In another example, the visual odometry (VO) operations may be performed using machine-learning algorithms (e.g., CNNs). In an example, the type of visual data analyzed generally comprises keypoints automatically extracted by the VO features extractor. In an example, the keypoints may comprise corners, edges, and/or other basic image features.

The measured dynamic set-points 606 and environment information 608 may be presented as inputs to an AI model 610. The AI model 610 is generally configured by weights and bias parameters 612 to generate the dynamic actuator map in an example embodiment. The AI model 610 generally presents an output comprising actuator commands (or values) 614. The actuator commands may include, but are not limited to, steering wheel angle value, acceleration (e.g., throttle position) value, deceleration (e.g., brake position) value, transmission gear selector position value, etc.

The AI model 610 generally comprises a fully-connected neural network, because the input are not images but numerical values (e.g., the dynamic set-points and additional environmental variables such as speed of the vehicle). In order to provide a more precise actuation map, the slope of the road may be also taken into account (e.g., the throttle has to be pushed more when going uphill). In an example, the slope of the road may be taken into account indirectly by feeding the AI model 610 with the current pitch angle of the vehicle (e.g., obtained using an accelerometer, which is also typically already present in modern vehicles) and letting the AI model 610 learn the relation with the slope by itself. In another example, the slope may be also estimated using a dedicated algorithm (e.g., a CNN analyzing the video frames 602a-602n).

During the training process 600, the weights and bias parameters 612 may be modified based on the measured dynamic set-points 606, the environmental information (e.g., sensor data) 608, and a training dataset comprising random dynamic set-points and corresponding actuator values that are representative of one or more desired inferences. In an example, the actuator values of the training dataset may be read from control modules or dedicated sensors of a vehicle, or a fleet of vehicles, being driven by one or more human drivers along the path imaged in the video frames 602a-602n. The actuator commands may include, but are not limited to, steering wheel angle value, acceleration (e.g., throttle position) value, deceleration (e.g., brake position) value, transmission gear selector position value, etc. The training dataset may enable the AI model 610 to have a ground truth basis for determining which actuator commands should be generated for particular dynamic set-points and environmental inputs. In an example, the weights and bias parameters 612 may be modified to minimize variations between the actuator values generated by the AI model 610 and the actuator values in the training dataset, which were read from the control modules and or dedicated sensors while the human drivers were following the path that created the measured dynamic set-points 606.

In an example, the measured dynamic set-points 606 generally comprise acceleration and curvature values. In an example, the environmental variables 608 generally comprise speed. In another example, the environmental variables 608 may also comprise slope of the road (e.g., the throttle has to be pushed more when going uphill). In an example, the slope of the road may be determined indirectly from the current pitch angle of the vehicle (e.g., obtained using an accelerometer, which is also typically already present in modern vehicles). However, the slope may be also estimated using a dedicated algorithm (e.g., CNN analyzing video frames).

A block (or circuit) 610 is shown. The circuit 610 may implement a computing device, a processor and/or a server computer. The circuit 610 may implement a centralized artificial neural network. In an example implementing a dynamic actuation map, the circuit 610 may implement a centralized fully-connected neural network. The centralized fully-connected neural network 610 may comprise a set of weights and bias parameters 612. The circuit 610 may implement an artificial intelligence model. The centralized fully-connected neural network 610 may comprise other components (e.g., a processor, a memory, various dedicated hardware modules, a communication device, etc.). The number, type and/or arrangement of the components of the circuit 610 may be varied according to the design criteria of a particular implementation.

The circuit 604 may be configured to receive the pair of consequent video frames 602a and 602b. The circuit 604 may be configured to generate the measured dynamic set-points 606. The circuit 604 may be configured to generate the measured dynamic set-points 606 based upon visual odometry operations performed on the video frames 602a and 602b. In an example, the circuit 604 may begin by finding keypoints in the video frames 602a and 602b. The circuit 604 may match keypoints found in the video frames 602a and 602b. The circuit 604 may then compute an optimal rototranslation of the camera from which the video frames 602a and 602b were obtained which explains the change of position of the matched keypoints. By averaging a sequence of rototranslations, the visual odometry performed by the circuit 604 may be able to estimate the vehicle speed, acceleration, and curvature values (e.g., the measured dynamic set-points 606 of the vehicle).

The circuit 610 may be configured to receive the measured dynamic set-points 606 and the environmental info 608. The circuit 610 may be configured to generate actuator commands 614. The circuit 610 may be configured to generate the actuator commands 614 based upon the measured dynamic set-points 606, the environmental info 608, and the set of weights and bias parameters 612. When the training process is completed, the set of weights and bias parameters 612 and the chosen neural network topology generally implement the most suitable function for matching the actuator commands 614 to the measured dynamic set-points 606 and the environmental info 608 received at the inputs of the circuit 610.

The circuits 604 and 610 may comprise similar functionality as the ANN module 150. The circuits 604 and 610 may have access to greater computing resources (e.g., power, processing capabilities, memory, etc.) than the processors 106a-106n. In an example, the circuits 604 and 610 may be implemented as part of a cloud computing service, configured to scale resources based on demand. The additional computing capabilities of the circuits 604 and 610 may be capable of handling the autonomous driving tasks of the vehicle.

The AI model 610 may be configured to implement and/or generate a machine-readable directed acyclic graph (DAG) to generate the actuator commands 614. The DAG and the set of weights and bias parameters 612 may be loaded as part of the AI model 610 for generating the actuator commands 614. Descriptions of operations performed by the circuit 610 may be assumed to apply to the ANN module 150 interchangeably. In one example, training the AI model 610 may determine and/or calculate parameters, weighting values and/or biases for the directed acyclic graph. The trained AI model 610 may be a DAG with parameters, weighting values and/or biases pre-programmed and/or pre-defined (e.g., based on self-directed learning). In some embodiments, the trained AI model 610 may be a quantized neural network (e.g., a reduced size neural network configured to operate on an edge device that has been modified based on a full-size neural network that was trained offline (e.g., on the circuit 610).

The machine learning performed by the ANN module 150 and/or the circuit 610 may comprise supervised training. For example, the ANN module 150 may be self-trained using the training data comprising dynamic set-points and actuator values. Supervised learning may enable the ANN module 150 to automatically adjust the weighting values and/or biases in response to actuator values contained within the training data (e.g., a designer and/or engineer may not need to program the weighting values for the AI model 610). The actuator values contained within the training data may provide ground truth data. Backpropagation may be implemented to compute a gradient with respect to the weighting values in response to the training data. For example, the training data may enable the ANN module 150 to extract characteristics and apply the extracted characteristics to the weighting values based on the actuator values.

Figure 7:
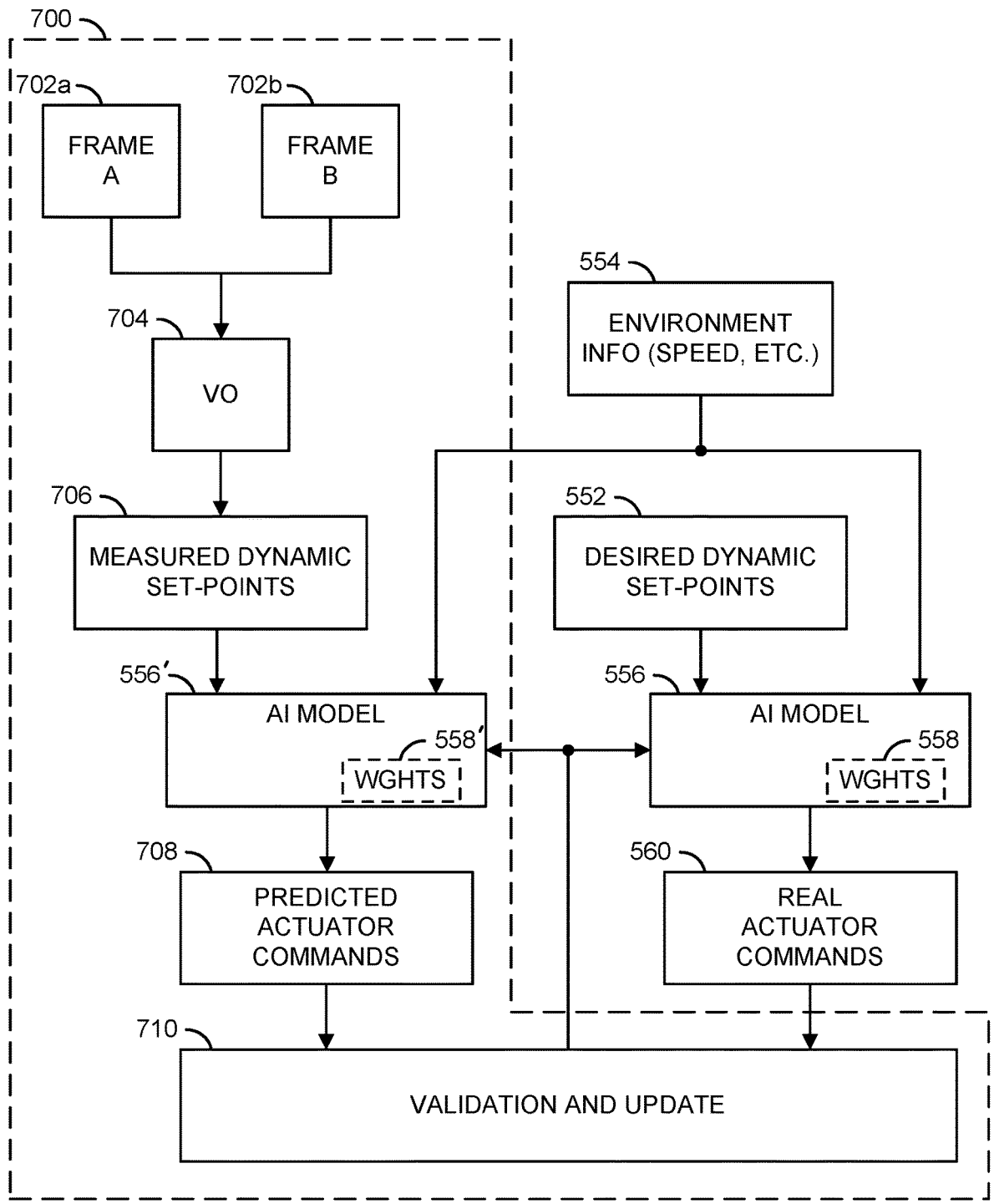
FIG. 7 is a diagram illustrating a technique for real time updating of the neural network of FIG. 5 in an example embodiment.

Referring to FIG. 7, a diagram is shown illustrating a technique for real time updating of the dynamic actuation map of FIG. 5 in an example embodiment. In an example, an update module 700 may be operated concurrently (in parallel) with the dynamic actuation map implemented by the neural network module 550 of FIG. 5. In an example, the update module may comprise an AI Model 556' that is a duplicate (e.g., same neural network topology and weights and bias parameters) of the AI model 556. The update module 700 may be configured to generate a measured dynamic set-points using pixel data from one or more cameras of a vehicle. The measured set-points along with environmental information may be presented as inputs to the AI model 556'. The AI model 556' may generate predicted actuator commands (values) based on the measured set-points and the environmental information.

The update module 700 may be configured to compare the predicted actuator commands generated by the dynamic actuation map implemented by the neural network 556' with real actuator commands generated by the dynamic actuation map implemented by the neural network module 550. Depending upon a result of the comparison, the update module 700 may update the weights and bias parameters of the AI model 556 and the AI model 556'. In an example, the update module 700 may be configured to receive the environmental information 554 presented to the dynamic actuation map implemented by the neural network module 550 and monitor the real actuator commands generated by the dynamic actuation map implemented by the neural network module 550. Whenever the predicted actuator commands generated by the AI model 556' do not match the monitored actuator commands (e.g., above or below a certain threshold), a weight update procedure may be triggered in order to obtain an updated actuation map. In one example, the previous actuation map may be definitively overwritten. In another example, the previous actuation map may be overwritten with the possibility of being restored. In still another example, the developer may choose overwriting the previous actuation map definitively in one situation (e.g., in case of permanent vehicle changes such as changes in tire pressure) or overwriting the previous actuation map with the ability of restoring the previous actuation map at some point in another situation (e.g., in case of temporary changes such as wet roads).

In an alternative embodiment, instead the AI model 556 a human driver may be responsible for selecting the real actuator commands. The update procedure may be a fine-tuning of an already-trained AI model using the new samples in which the predicted actuator commands and the real actuator commands are different. In an example, the new training samples may comprise the measured dynamic set-points, the related environmental info, and the related real actuator commands.

A dynamic updating mode of operation of a neural network implementing a dynamic actuation map in an example embodiment is shown. In an example, the update module 700 for updating a trained actuation map may use processed pixel data (e.g., from the number of cameras around the vehicle) arranged as a number of video frames 702a-702n. The video frames 702a-702n generally provide images of a path (or route) being driven by the vehicle. The update module 700 generally uses the images of the path (or route) being driven by the vehicle to generate measured dynamic set-points. Images may also be used to generate an estimation of a current speed and/or pitch angle of the vehicle. In an example, the current speed and/or pitch angle of the vehicle may be also obtained from sensors (e.g., accelerometer, wheel rotation sensors, etc.) present in every modern vehicle.

In an example, the update module 700 may process a pair of video frames (e.g., 702a and 702b, etc.) by performing computer vision operations to detect features in the video frames. The update module 700 may be configured to determine the measured dynamic set-points for the vehicle utilizing the features detected in the video frames. In an example, the update module 700 may perform visual odometry (VO) operations 704 on the features detected in the video frames to generate measured dynamic set-points 706. In an example, the visual odometry (VO) operations may be performed (e.g., by the computer vision pipeline portion 162) using a traditional algorithm. The traditional algorithm may perform computations comparing the features of two consequent frames of each camera of the vehicle. In another example, the visual odometry (VO) operations may be performed using machine-learning algorithms (e.g., CNNs). In an example, the type of visual data analyzed generally comprises keypoints automatically extracted by the VO features extractor. In an example, the visual odometry (VO) operations 704 may begin by finding keypoints in the video frame 702a. The visual odometry (VO) operations 704 may then find keypoints in the video frame 702b. The visual odometry (VO) operations 704 may then match the keypoints found in the video frames 702a and 702b. The visual odometry (VO) operations 704 may then compute an optimal rototranslation of the camera (and hence the vehicle) that explains the change in position of the matched keypoints. By averaging a sequence of rototranslations, the vehicle speed, acceleration, and curvature may be estimated. In an example, the keypoints may comprise corners, edges, and/or other basic image features.

The measured dynamic set-points 706 and the environment information 554 may be presented as inputs to the AI model 556'. The AI model 556' generally presents an output comprising predicted actuator commands (or values) 708. The predicted actuator commands may include, but are not limited to, steering wheel angle value, acceleration (e.g., throttle position) value, deceleration (e.g., brake position) value, transmission gear selector position value, etc.

The AI model 556' generally comprises a fully-connected neural network, because the input are not images but numerical values (e.g., the measured dynamic set-points and additional environmental variables such as speed of the vehicle). In order to provide a more precise actuation map, the slope of the road may be also taken into account (e.g., the throttle has to be pushed more when going uphill). In an example, the slope of the road may be taken into account indirectly by feeding the AI model 556' with the current pitch angle of the vehicle (e.g., obtained using an accelerometer, which is also typically already present in modern vehicles). In another example, the slope may be also estimated using a dedicated algorithm (e.g., a CNN analyzing the video frames 702a-702n).

The update module 700 may be configured to perform a validation and update process 710. During the validation and update process 710, the predicted actuator commands generated by the AI model 556' and the real actuator commands generated by the AI model 556 may be compared. Based upon the result of the comparison, the validation and update process 710 may update the weights and bias parameters 558' of the AI model 556' and the weights and bias parameters 558 of the AI model 556. The visual odometry (VO) operations 704 generally provide the measured dynamic set-points 706 of the vehicle. The actuator commands needed to produce the dynamic motion of the vehicle represented by the measured dynamic set-points 706 may be predicted from the measured dynamic set-points. If the actuator commands predicted from the measured dynamic set-points do not match the real actuator commands 560 selected by the AI model 556, the update process may be triggered.

In an alternative embodiment, a human driver may control the driving commands of the vehicle during the real time update process. In an example where a human driver is operating the vehicle, the desired dynamic set-points (e.g., curvature values, acceleration, deceleration, etc.) are generally determined by the driver and translated into the real actuator commands 560 using various vehicle controls. In an example, curvature values may be received from the steering wheel, and acceleration and deceleration values may be selected by the human driver using pedals. If the actuator commands predicted from the measured dynamic set-points do not match the real actuator commands 560 selected by the human driver, the update process may be triggered to update the AI model 556'. In an example, the update process may comprise a fine-tuning of the already-trained AI model 556' using the new samples in which the predicted commands and real commands were different. In an example, the new training samples may comprise the measured set-points 706, the related environmental information 554, and the related real actuator commands 560.

A block (or circuit) 704 may be configured to receive the pair of consequent video frames 702a and 702b. The circuit 704 may be configured to generate the measured dynamic set-points 706. The circuit 704 may be configured to generate the measured dynamic set-points 706 based upon visual odometry operations performed on the video frames 702a and 702b. In general, dynamic set-points that are estimated using the VO are generally referred to as measured (or current) dynamic set-points herein, because the measured dynamic set-points are an estimation of the current situation. In contrast, dynamic set-points that are provided by (or received from) path-planning algorithms are generally referred to as desired dynamic set-points herein, because the desired dynamic set-points are wanted but not necessarily instantly reachable or even feasible. Similarly, the terms current actuator commands and real actuator commands may be used when referring to actuator commands currently being executed by the vehicle. At the same time, the term predicted actuator commands is used when the actuator commands are deduced but not actuated.

A circuit implementing the AI model 556' may be configured to receive the measured dynamic set-points 706 and the same environmental information 554 presented to the AI model 556. The circuit implementing the AI model 556' may be configured to generate the predicted actuator commands 708. The circuit implementing the AI model 556' may be configured to generate the predicted actuator commands 708 based upon the measured dynamic set-points 706, the environmental info 554, and the set of weights and bias parameters. When the dynamic updating process is completed, the set of weights and bias parameters 558 of the AI model 556 and the set of weights and bias parameters 558' of the AI model 556' generally implement the most suitable function for matching the actuator commands 560 to the desired dynamic set-points 552 and the environmental info 554 received at the inputs of the AI model 556.

The circuit implementing the AI model 556' may comprise similar functionality as the ANN module 150. The circuit implementing the AI model 556' may have access to greater computing resources (e.g., power, processing capabilities, memory, etc.) than the processors 106a-106n. In an example, the circuit implementing the AI model 556' may be implemented as part of a cloud computing service, configured to scale resources based on demand. The additional computing capabilities of the circuit implementing the AI model 556' may be capable of handling the autonomous driving tasks of the vehicle.

The AI model 556' may be configured to implement and/or generate a machine-readable directed acyclic graph (DAG) to generate the predicted actuator commands 708. The DAG and the set of weights and bias parameters may be loaded as part of the AI model 556' for generating the predicted actuator commands 708. Descriptions of operations performed by the circuit implementing the AI model 556' may be assumed to apply to the ANN module 150 interchangeably. In some embodiments, the AI model 556' may be a quantized neural network (e.g., a reduced size neural network configured to operate on an edge device that has been modified based on a full-size neural network that was trained offline.

Figure 8:
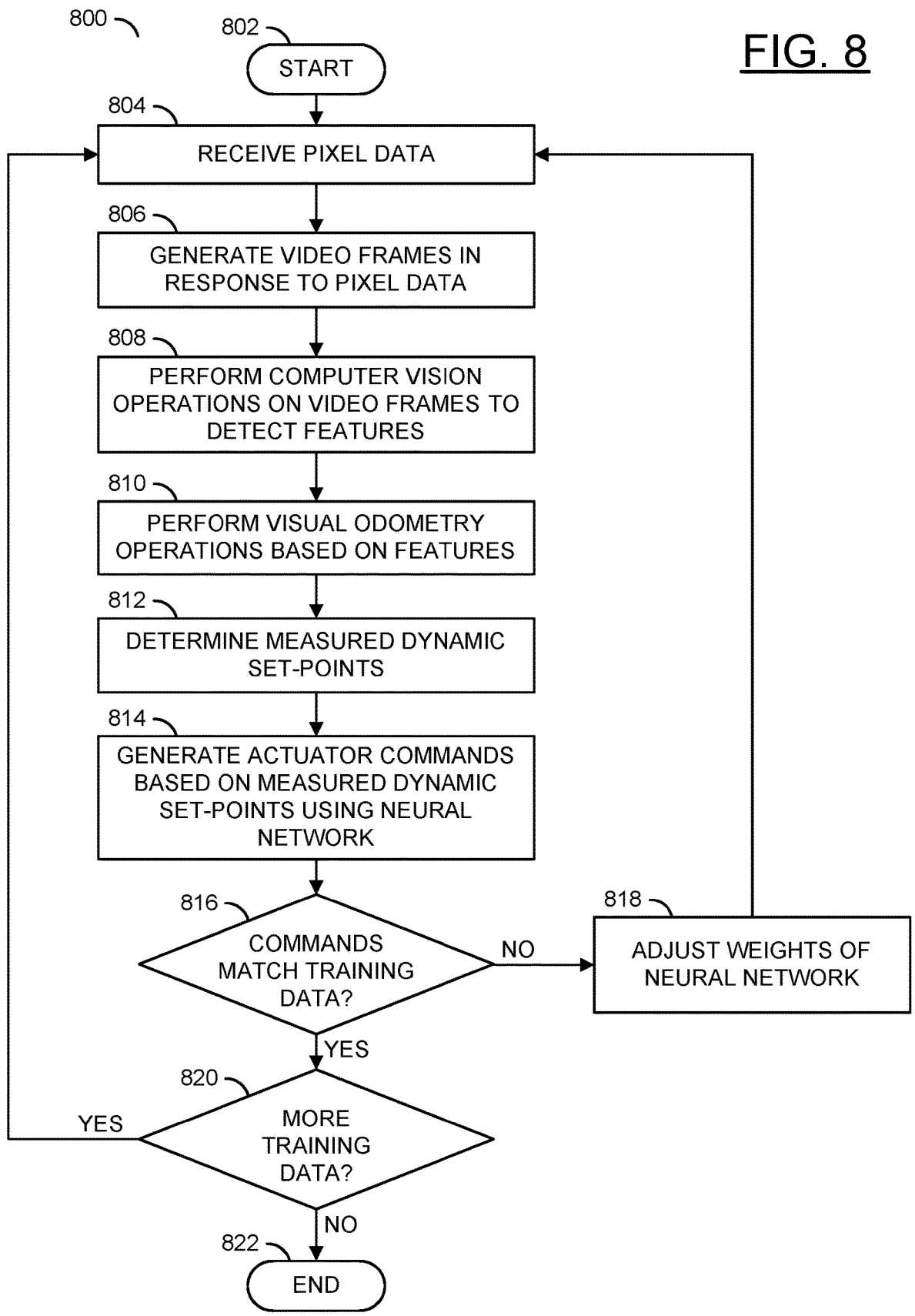
FIG. 8 is a flow diagram illustrating a process for training the neural network of FIG. 5 in an example embodiment.

Referring to FIG. 8, a flow diagram is shown illustrating a process for training a neural network implementing a dynamic actuation map in an example embodiment. A process (or method) 800 may be implemented to train a neural network implementing a dynamic actuation map in an example embodiment. The method 800 generally comprises a step (or state) 802, a step (or state) 804, a step (or state) 806, a step (or state) 808, a step (or state) 810, a step (or state) 812, a step (or state) 814, a decision step (or state) 816, a step (or state) 818, a decision step (or state) 820, and a step (or state) 822.

The step 802 may start the method 800. In the step 804, the processors 106a-106n may receive pixel data. The pixel data received may be pixel data from the number of cameras around the vehicle. One or more of the capture devices 102a-102n may present the signals FRAMES_A-FRAMES_N to the processors 106a-106n. Next, in the step 806, the processors 106a-106n may process the pixel data arranged as video frames. For example, one or more of the dedicated hardware modules 180a-180n and/or the video processing pipeline 156 may generate video frames from the signals FRAMES_A-FRAMES_N. Next, the method 800 may move to the step 808.

In the step 808, the processors 106a-106n may perform computer vision operations on the video frames to detect features in the video frames. The method 800 may then move to the step 810. In the step 810, visual odometry (VO) operations may be performed on the features detected in the video frames. In an example, the visual odometry (VO) operations may be performed (e.g., by the computer vision pipeline portion 162) using a traditional algorithm. The traditional algorithm may perform computations comparing the features of two consequent frames (e.g., frame A and frame B) of each camera. In another example, the visual odometry (VO) operations may be performed using machine-learning algorithms (e.g., CNNs). In an example, the type of visual data analyzed generally comprises keypoints automatically extracted by the VO features extractor. In an example, the keypoints may comprise corners, edges, and/or other basic image features.

In an example, the visual odometry (VO) operations may perform a number of sub-steps including, but not limited to, finding keypoints in the frame A, finding keypoints in the frame B, matching keypoints found in the frames A and B, and computing an optimal rototranslation of the camera that would explain the change of position of the matched keypoints.

In the step 812, the method 800 may determine (measure) measured dynamic set-points (e.g., acceleration, curvature, etc.) based on results of the VO operations. In an example, speed and acceleration values for the vehicle and curvature values of the path (or route) the vehicle is traveling may be estimated by averaging a sequence of rototranslations determined in the step 810. Next, the method 800 may move to the decision step 814.

In the step 814, the method 800 generate actuator commands for controlling the vehicle based on the measured dynamic set-points determined in the step 812 using an artificial neural network implementing an AI model of a dynamic actuation map in an example embodiment. In an example, the measured dynamic set-points determined in the step 814 and environment information collected using sensors of the vehicle may be presented as inputs to the AI model of the dynamic actuation map. The AI model is generally configured by weights and bias parameters to generate the dynamic actuation map. The AI model generally presents an output comprising actuator commands (or values). The actuator commands may include, but are not limited to, steering wheel angle value, acceleration (e.g., throttle position) value, deceleration (e.g., brake position) value, transmission gear selector position value, etc.

In the decision step 816, the method 800 may determine whether the actuator commands generated by the AI model match (e.g., based on a predefined threshold) real actuator commands contained in a training dataset which corresponding to the dynamic set-points. If the actuator commands generated by the AI model do not match the real actuator commands, then the method 800 may move to the step 818. If the actuator commands generated by the AI model match the real actuator commands, then the method 800 may move to the decision step 820. In the step 818, the method 800 may adjust weight values of the neural network to try to get a convergence between the generated (predicted) actuator commands and the real actuator commands. The method 800 may then return to the step 804.

In the decision step 820, the method 800 may determine whether more training data is available. If more training data is available, then the method 800 may return to the step 804. If there is no further training data, then the method 800 may move to the step 822 and terminate.

Figure 9:
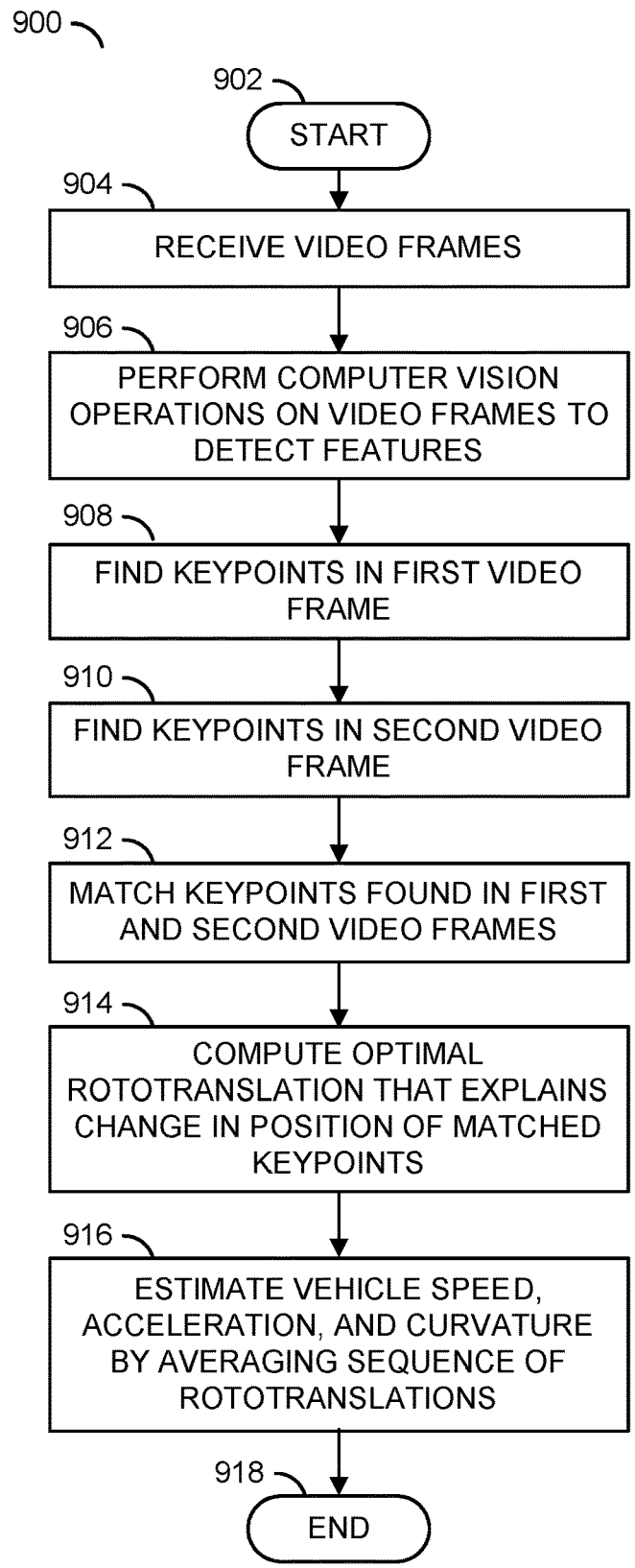
FIG. 9 is a flow diagram illustrating a visual odometry process.

Referring to FIG. 9, a flow diagram is shown illustrating an example visual odometry process. A process (or method) 900 may be implemented to perform visual odometry in an example embodiment. The method 900 generally comprises a step (or state) 902, a step (or state) 904, a step (or state) 906, a step (or state) 908, a step (or state) 910, a step (or state) 912, a step (or state) 914, a step (or state) 916, and a step (or state) 918.

The step 902 may start the method 900. In the step 904, the processors 106a-106n may receive pairs of video frames. In the step 906, the processors 106a-106n may perform computer vision operations on the pairs of video frames to detect features in the video frames. The method 900 may then move to the step 908. In the step 908, the method 900 may find keypoints in a first video frame of a pair of consequent video frames. The method 900 may then move to the step 910. In the step 910, the method 900 may find keypoints in a second video frame of the pair of consequent video frames. The method 900 may then move to the step 912. In the step 912, the method 900 may match the keypoints found in the first and the second video frames of the pair of consequent video frames. The method 900 may then move to the step 914.

In the step 914, the method 900 may compute an optimal rototranslation of the camera from which the pair of video frames was obtained that would explain the change of position of the matched keypoints in the pair of video frames. In the step 916, the method 900 may estimate dynamic set-points (e.g., speed, acceleration, curvature, etc.) by averaging a sequence of rototranslations. Next, the method 900 may move to the step 918 and terminate.

Figure 10:
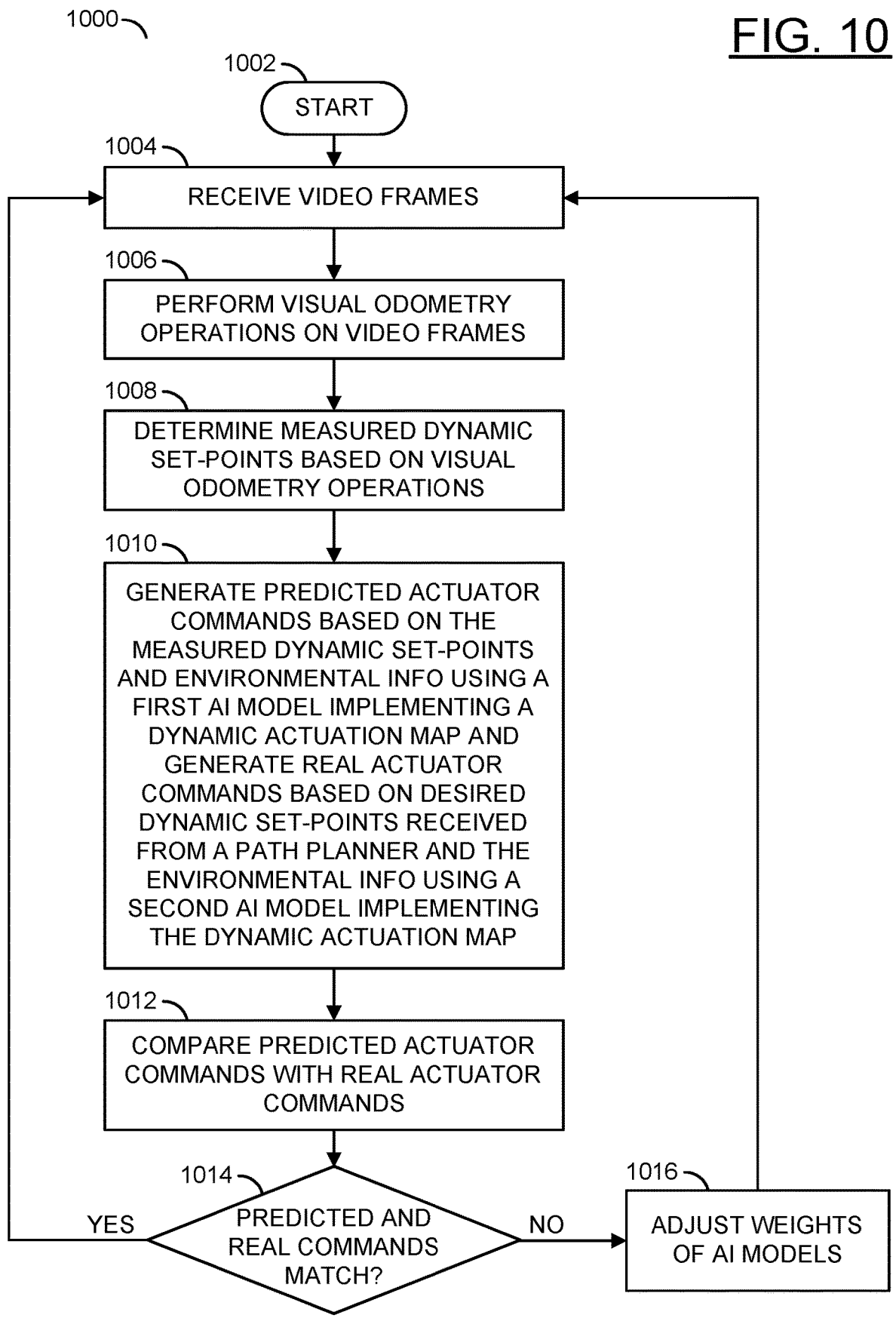
FIG. 10 is a flow diagram illustrating a process for real time updating of the neural network of FIG. 5 in an example embodiment.

Referring to FIG. 10, a flow diagram is shown illustrating a process for real time updating of a neural network implementing a dynamic actuation map in an example embodiment. A process (or method) 1000 may be implemented to perform real time updating of a neural network implementing a dynamic actuation map in an example embodiment. The method 1000 generally comprises a step (or state) 1002, a step (or state) 1004, a step (or state) 1006, a step (or state) 1008, a step (or state) 1010, a step (or state) 1012, a decision step (or state) 1014, and a step (or state) 1016.

The step 1002 may start the method 1000. In the step 1004, the processors 106a-106n may process pixel data arranged as video frames. The pixel data arranged as frames may be pixel data from the number of cameras around the vehicle. One or more of the capture devices 102a-102n may present the signals FRAMES_A-FRAMES_N to the processors 106a-106n. The processors 106a-106n may process the pixel data arranged as video frames. For example, one or more of the dedicated hardware modules 180a-180n and/or the video processing pipeline 156 may generate video frames from the signals FRAMES_A-FRAMES_N. Next, the method 1000 may move to the step 1006.

In the step 1006, the processors 106a-106n may perform computer vision operations on the video frames to detect features in the video frames. Visual odometry (VO) operations may be performed on the features detected in the video frames. In an example, the visual odometry (VO) operations may be performed (e.g., by the computer vision pipeline portion 162) using a traditional algorithm. The traditional algorithm may perform computations comparing the features of two consequent frames (e.g., frame A and frame B) of each camera. In another example, the visual odometry (VO) operations may be performed using machine-learning algorithms (e.g., CNNs). In an example, the type of visual data analyzed generally comprises keypoints automatically extracted by the VO features extractor. In an example, the keypoints may comprise corners, edges, and/or other basic image features.

In an example, the visual odometry (VO) operations may perform a number of sub-steps including, but not limited to, finding keypoints in a first frame, finding keypoints in a second consequent frame, matching keypoints found in the first and the second frames, and computing an optimal rototranslation of the camera that would explain the change of position of the matched keypoints.

In the step 1008, the method 1000 may determine measured dynamic set-points (e.g., acceleration, curvature, etc.) based on results of the VO operations. In an example, speed and acceleration values for the vehicle and curvature values of the path (or route) the vehicle is traveling may be estimated by averaging a sequence of rototranslations determined in the step 1006. Next, the method 1000 may move to the step 1010.

In the step 1010, the method 1000 may generate predicted actuator commands for controlling the vehicle based on the measured dynamic set-points determined in the step 1008 and environmental info collected from the vehicle. The predicted actuator commands may be generated using a first artificial neural network implementing an AI model of a dynamic actuation map in an example embodiment. In an example, the measured dynamic set-points determined in the step 1008 and environment information collected using sensors of the vehicle may be presented as inputs to the first artificial neural network implementing the AI model of the dynamic actuation map. The AI model is generally configured by weights and bias parameters to generate the predicted dynamic actuation map. The first artificial neural network implementing the AI model of the dynamic actuation map generally presents an output comprising the predicted actuator commands (or values). The predicted actuator commands may include, but are not limited to, steering wheel angle value, acceleration (e.g., throttle position) value, deceleration (e.g., brake position) value, transmission gear selector position value, etc.

Concurrently with generating the predicted actuator commands for controlling the vehicle based on the measured dynamic set-points determined in the step 1008 and environmental info collected from the vehicle, the method 1000 may generate real actuator commands for controlling the vehicle based on desired dynamic set-points and the environmental info collected from the vehicle. The real actuator commands may be generated using a second artificial neural network implementing the AI model of the dynamic actuation map in an example embodiment. In an example, the desired dynamic set-points may be received from a path planning application. The desired dynamic set-points and the environment information collected using sensors of the vehicle may be presented as inputs to the second artificial neural network implementing the AI model of the dynamic actuation map. The second artificial neural network implementing the AI model is generally configured by weights and bias parameters to generate the dynamic actuation map. The second artificial neural network implementing the AI model of the dynamic actuation map generally presents an output comprising the real actuator commands (or values). The real actuator commands may include, but are not limited to, steering wheel angle value, acceleration (e.g., throttle position) value, deceleration (e.g., brake position) value, transmission gear selector position value, etc.

In the decision step 1012, the method 1000 may determine whether the predicted actuator commands generated by the first neural network implementing the AI model match (e.g., based on a predefined threshold) the real actuator commands generated by the second neural network implementing the AI model. If the predicted actuator commands generated by the first neural network implementing the AI model match the real actuator commands, then the method 1000 may move to the step 1004. If the predicted actuator commands generated by the first neural network implementing the AI model do not match the real actuator commands, the method 1000 may move to the step 1016. In the step 1016, the method 1000 may adjust the weight values of the first neural network and the second neural network to try to get a convergence between the predicted actuator commands and the real actuator commands. The method 1000 may then move to the step 1004.

The functions performed by the diagrams of FIGS. 1-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface to receive pixel data corresponding to an area outside of a vehicle and sensor data from said vehicle; and
a processor configured to store and execute a first trained neural network model that generates one or more real actuator commands for said vehicle in response to said sensor data from said vehicle, desired dynamic set-points for said vehicle received from a path planning application of said vehicle, and one or more inferences made by said first trained neural network model using said sensor data from said vehicle and said desired dynamic set-points for said vehicle as input, wherein said processor is configured to process said pixel data arranged as video frames, the one or more real actuator commands for said vehicle are presented at an output of said first trained neural network model, and said first trained neural network model was trained by performing computer vision operations to detect features in a first set of said video frames, determining a first set of measured dynamic set-points for said vehicle by applying visual odometry operations on said features detected in said first set of said video frames, and modifying a plurality of weights of an untrained neural network model based on said first set of measured dynamic set-points, said sensor data, and a training dataset comprising dynamic set-points and corresponding actuator values that are representative of one or more desired inferences.

2. The apparatus according to claim 1, wherein said first trained neural network model comprises a fully connected neural network.

3. The apparatus according to claim 1, wherein said dynamic set-points comprise acceleration and curvature values.

4. The apparatus according to claim 1, wherein said sensor data comprises environmental information.

5. The apparatus according to claim 4, wherein said environmental information comprises a pitch angle of said vehicle to enable said first trained neural network model to take into account a slope of a road said vehicle is traveling.

6. The apparatus according to claim 5, wherein said environmental information further comprises a speed of said vehicle determined based on said visual odometry operations applied to said video frames.

7. The apparatus according to claim 5, wherein said pitch angle of said vehicle is determined based on a machine learning algorithm applied to said video frames.

8. The apparatus according to claim 5, wherein said pitch angle of said vehicle is obtained using an accelerometer.

9. The apparatus according to claim 1, wherein said real actuator commands for said vehicle are configured to control operation of said vehicle.

10. The apparatus according to claim 9, wherein said real actuator commands are configured to control one or more actuators of said vehicle.

11. The apparatus according to claim 10, wherein said one or more actuators of said vehicle control one or more of an accelerator, a steering mechanism, and a braking system.

12. The apparatus according to claim 11, wherein said one or more actuators of said vehicle control a gear selector.

13. The apparatus according to claim 1, wherein said processor is further configured to update weights of said first trained neural network model in real time.

14. The apparatus according to claim 13, wherein said processor is further configured to update said weights of said first trained neural network model in response to a change in one or more dynamics of said vehicle exceeding a predefined threshold.

15. The apparatus according to claim 14, wherein said one or more dynamics comprise one or more of physical changes in said vehicle, changes in road conditions, and changes in weather conditions.

16. The apparatus according to claim 13, wherein said processor is further configured to store and execute a second trained neural network model that generates one or more predicted actuator commands for said vehicle in response to said sensor data from said vehicle, measured dynamic set-points for said vehicle, and one or more inferences made by said second trained neural network model using said sensor data from said vehicle and said measured dynamic set-points as input, said first trained neural network model and said second trained neural network model have substantially similar architectures and weights, and said processor is further configured to update said first trained neural network model by (i) performing said computer vision operations to detect said features in a second set of said video frames, (ii)

determining said measured dynamic set-points for said vehicle by applying said visual odometry operations on said features detected in said second set of said video frames, (iii) executing said second trained neural network model to generate said one or more predicted actuator commands for said vehicle in response to said sensor data from said vehicle and said measured dynamic set-points, (iv) comparing said one or more predicted actuator commands generated by said second trained neural network model with said one or more real actuator commands generated by said first trained neural network model, and (v) modifying said weights of said first trained neural network model and said weights of said second trained neural network model to minimize a difference between said one or more predicted actuator commands generated by said second trained neural network model and said one or more real actuator commands generated by said first trained neural network model.

17. The apparatus according to claim 16, wherein said processor is further configured to update said weights of said first trained neural network model and said weights of said second trained neural network model when said difference between said one or more predicted actuator commands generated by said second trained neural network model and said one or more real actuator commands generated by said first trained neural network model exceeds a predefined threshold.

18. A method of updating weights of a neural network model implementing a dynamic actuation map for a vehicle in real time comprising:
    processing pixel data corresponding to an area outside of said vehicle arranged as video frames;
    performing computer vision operations to detect features in said video frames;
    determining measured dynamic set-points for said vehicle by applying visual odometry operations on said features detected in said video frames;
    generating one or more real actuator commands in response to sensor data from said vehicle and desired dynamic set-points received from a path planning application of said vehicle using a first trained neural network model;
    generating one or more predicted actuator commands in response to said sensor data from said vehicle and said measured dynamic set-points using a second trained neural network model, wherein said first trained neural network model and said second trained neural network model have substantially similar architectures and weights;
    comparing said one or more predicted actuator commands generated by said first trained neural network model with said one or more real actuator commands generated by said second trained neural network model; and
    modifying said weights of said first trained neural network model and said weights of said second trained neural network model to minimize a difference between said one or more predicted actuator commands generated by said second trained neural network model and said one or more real actuator commands generated by said first trained neural network model.

19. The method according to claim 18, wherein said weights of said first trained neural network model and said weights of said second trained neural network model are updated when said difference between said one or more predicted actuator commands generated by said second trained neural network model and said one or more real actuator commands generated by said first trained neural network model exceeds a predefined threshold.

20. The method according to claim 18, wherein updating said weights of said first trained neural network model and said weights of said second trained neural network model is performed in response one or more of physical changes in said vehicle, changes in road conditions, and changes in weather conditions.

\* \* \* \* \*